(12) United States Patent
Kuwata et al.

(10) Patent No.: US 9,601,793 B2
(45) Date of Patent: Mar. 21, 2017

(54) ELECTROLYTE FILM—ELECTRODE ASSEMBLY

(71) Applicant: NISSAN MOTOR CO., LTD., Yokohama-shi, Kanagawa (JP)

(72) Inventors: Shigemasa Kuwata, Yokohama (JP); Yozo Okuyama, Yokosuka (JP); Kazufumi Kodama, Zushi (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 45 days.

(21) Appl. No.: 14/383,419

(22) PCT Filed: Mar. 5, 2013

(86) PCT No.: PCT/JP2013/055902
§ 371 (c)(1),
(2) Date: Sep. 5, 2014

(87) PCT Pub. No.: WO2013/133238
PCT Pub. Date: Sep. 12, 2013

(65) Prior Publication Data
US 2015/0024301 A1    Jan. 22, 2015

(30) Foreign Application Priority Data
Mar. 8, 2012 (JP) ................................. 2012-052026

(51) Int. Cl.
| H01M 8/10 | (2016.01) |
| H01M 8/02 | (2016.01) |
| H01M 8/04 | (2016.01) |

(52) U.S. Cl.
CPC ....... *H01M 8/1002* (2013.01); *H01M 8/0234* (2013.01); *H01M 8/0243* (2013.01);
(Continued)

(58) Field of Classification Search
CPC . H01M 2008/1095; H01M 2300/0082; H01M 8/0234; H01M 8/0243;
(Continued)

(56) References Cited

U.S. PATENT DOCUMENTS 7,807,314 B2    10/2010  Tanaka et al.
2001/0041282 A1  11/2001  Yamamoto et al.
(Continued)

FOREIGN PATENT DOCUMENTS

EP    1 139 476 A2    10/2001
JP    2001-283875 A   10/2001
(Continued)

OTHER PUBLICATIONS

M. A. Raza, A. Westwood, A. Brown, N. Hondow, C. Stirling. Graphite Nanoplatelets Produced by Oxidation and Thermal Exfoliation of Graphite and Electrical Conductivities of Their Epoxy Composites, J. Nanosci. NanoTechnol., vol. 12, 9259-9270, 2012.*
(Continued)

*Primary Examiner* — Carlos Barcena
(74) *Attorney, Agent, or Firm* — Foley & Lardner LLP

(57) ABSTRACT

An electrolyte membrane-electrode assembly comprises a polymer electrolyte membrane; a cathode catalyst layer and a cathode gas diffusion layer including a cathode micro porous layer and a cathode gas diffusion layer substrate, arranged in order on one side of the polymer electrolyte membrane, and an anode catalyst layer and an anode gas diffusion layer including an anode micro porous layer and an anode gas diffusion layer substrate, arranged in order on the other side of the polymer electrolyte membrane. A relative gas diffusion coefficient of the anode micro porous layer is smaller than a relative gas diffusion coefficient of the cathode micro porous layer by an amount equal to or greater than 0.05[−].

15 Claims, 6 Drawing Sheets

(52) U.S. Cl.
CPC ..... *H01M 8/0245* (2013.01); *H01M 8/04119* (2013.01); *H01M 8/1004* (2013.01); *H01M 2008/1095* (2013.01); *H01M 2300/0082* (2013.01); *Y02E 60/521* (2013.01)

(58) Field of Classification Search
CPC ........... H01M 8/0245; H01M 8/04119; H01M 8/1002; H01M 8/1004
See application file for complete search history.

(56) References Cited

U.S. PATENT DOCUMENTS

| | | |
|---|---|---|
| 2007/0141405 A1* | 6/2007 | Lai ...................... H01M 4/8605 429/483 |
| 2009/0104476 A1* | 4/2009 | Ji ......................... H01M 8/023 429/514 |
| 2010/0028750 A1 | 2/2010 | Ji et al. |
| 2011/0207022 A1 | 8/2011 | Wieser et al. |
| 2014/0120451 A1 | 5/2014 | Okuyama et al. |

FOREIGN PATENT DOCUMENTS

| | | |
|---|---|---|
| JP | 2004-158388 A | 6/2004 |
| JP | 2005-135838 A | 5/2005 |
| JP | 2007-250496 A | 9/2007 |
| JP | 2007-278826 A | 10/2007 |
| JP | 2010-146756 A | 7/2010 |

OTHER PUBLICATIONS

European Search Report dated Feb. 11, 2015, 8 pgs.

\* cited by examiner

ELECTROLYTE FILM—ELECTRODE ASSEMBLY

TECHNICAL FIELD

The present invention relates to an electrolyte membrane or film and electrode assembly. More specifically, the present invention relates to an electrolyte membrane-electrode assembly used in a solid polymer fuel cell or polymer electrolyte fuel cell (PEFC).

BACKGROUND ART

In recent years, attention has been paid to fuel cells as electric power sources for electric vehicles and stationary electric sources in concert with social requirements and movements on the background of energy and environmental problems. Fuel cells are classified into a variety of types according to kinds of electrolyte and kinds of electrode. Typical examples are alkaline type, phosphoric add type, molten carbonate type, solid electrolyte type, and polymer or solid polymer type. Of these, the spotlight of attention is focused on the polymer electrolyte fuel cell (PEFC) which is able to be operated at low temperatures (usually not higher than 100° C.) and which is in recent years developed for practical use as a low environmental pollution power source for automotive vehicle.

In general, PEFC includes an membrane-electrode assembly (MEA) sandwiched between separators. MEA in general has a laminate structure including a cathode gas diffusion layer (GDL), a cathode catalyst layer, a polymer or solid polymer electrolyte layer, an anode catalyst layer and an anode gas diffusion layer.

In MEA, the following electrochemical reactions proceed. First, hydrogen contained in fuel gas supplied to an anode (fuel electrode) side is oxidized to form protons and electrons by catalyst. Subsequently, the produced protons pass through a polymer electrolyte contained in the anode side catalyst layer and the polymer electrolyte membrane contacting with the anode side catalyst layer, and reaches the cathode (air electrode) side catalyst layer. The electrons produced in the anode side catalyst layer pass through an electrically conductive carrier constituting the anode side catalyst layer, the gas diffusion layer contacting to the anode side catalyst layer on the side opposite to the polymer electrolyte membrane, the separator and an outside circuit, and reach the cathode side catalyst layer. The protons and electrons reaching the cathode side catalyst layer react with oxygen contained in oxidizer gas supplied to the cathode side catalyst layer, and thereby produce water. In the fuel cell, it is possible to take out electricity to the outside through the above-mentioned electrochemical reactions.

In PEFC, water is required to retain the proton conductivity of the polymer electrode membrane, and insufficiency of water causes a condition in which PEFC becomes unable to continue the generation of electricity. This phenomenon is called dry-out. On the other hand, water is produced in the cathode, as mentioned before, and the produced water stays in the catalyst layer, GDL, and separator, and makes it difficult for oxygen to diffuse to the cathode catalyst layer, resulting in incapability of continuing the generation of electricity. This phenomenon is called flooding. As conceivable measures for improving the resistance to dry-out, it is possible to employ an electrolyte membrane capable of returning the water produced in the cathode to the anode quickly, or to decrease the drainage of water from MEA. As conceivable measures for improving the resistance to flooding, it is possible to employ the electrolyte membrane capable of returning the water produced in the cathode to the anode quickly, or to increase the drainage of water from MEA. However, the latter technique (the control of water drainage) for improving the dry-out resistance and the flooding resistance is difficult to achieve both objectives simultaneously since both are in a relationship of trade off.

For this problem, there is a report of a technique of providing a water retaining layer having an enhanced water holding property, between the electrode catalyst layer and the gas diffusion layer (Patent Document 1).

MEA disclosed in Patent Document 1 can improve the dry-out resistance with the water retaining layer. However, the flowing resistance remains poor under the humid condition, and therefore, the fuel cell using MEA disclosed in Patent Document 1 is insufficient in power generating performance.

Therefore, the present invention is devised in view of the above-mentioned situation, and aimed to provide an electrolyte membrane-electrode assembly capable of coping with both of the dryout resistance and the flooding resistance.

PRIOR ART LITERATURE

Patent Document(s)

Patent Document 1: JP2004-158388 A

SUMMARY OF THE INVENTION

Through assiduous study by the inventors of the present application to solve the above-mentioned problem, a finding has been reached that it is possible to solve the problem by providing anode micro porous layer and cathode micro porous layer, respectively in anode gas diffusion layer and cathode gas diffusion layer, and decreasing a relative gas diffusion coefficient of the anode side micro porous layer, and thus the invention has been completed.

According to the present invention, with the anode micro porous layer having a smaller relative gas diffusion coefficient provided on the anode side, the electrolyte membrane-electrode assembly can secure the water holding ability between the catalyst layer and GDL on the anode side and restrain dry-out in the dry condition. Additionally, with the cathode micro porous layer having a greater relative gas diffusion coefficient provided on the cathode side, the electrolyte membrane-electrode assembly can secure the water draining ability of the produced water on the cathode side and restrain cathode flooding in the wet condition. Therefore, the electrolyte membrane-electrode assembly according to the present invention can attain both of the dry-out resistance and the flooding resistance.

MODE(S) FOR CARRYING OUT THE INVENTION

Figure 1:
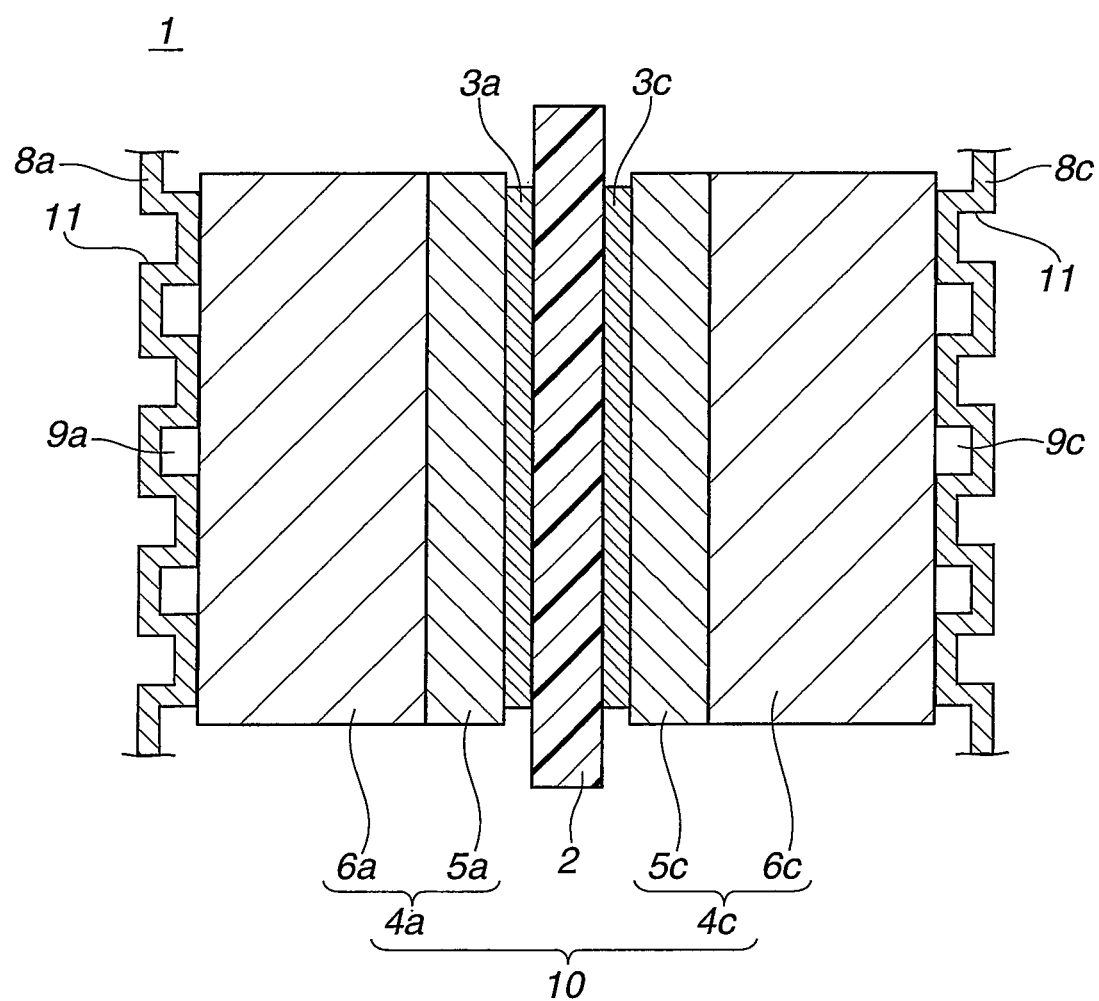
FIG. 1 is a schematic view showing the basic construction of a polymer electrolyte fuel cell (PEFC) according to a first embodiment of the present invention.

According to one embodiment of the present invention, an electrolyte membrane-electrode assembly comprises: a polymer electrolyte membrane; a structure including a cathode catalyst layer and a cathode gas diffusion layer including a cathode micro porous layer and a cathode gas diffusion layer substrate, arranged in order on one side of the polymer electrolyte membrane; and a structure including an anode catalyst layer and an anode gas diffusion layer including an anode micro porous layer and an anode gas diffusion layer substrate, arranged in order on the other side of the polymer electrolyte membrane; wherein a relative gas diffusion coefficient of the anode micro porous layer is smaller than a relative gas diffusion coefficient of the cathode micro porous layer by an amount or difference equal to or greater than 0.05[−]. (Hereinafter, this electrolyte membrane-electrode assembly is also referred to as "MEA according the present invention". The micro porous layer having the smaller relative gas diffusion coefficient is provided on the anode side to restrain or prevent permeation of water/vapor through the anode micro porous layer. Therefore, even in the dry (low humidity) condition, the membrane-electrode assembly can restrain or prevent drainage of water/vapor through GDL and the separator, and secure a sufficient amount of water to sustain the proton conductivity in the polymer electrolyte layer and catalyst layer. Therefore, the membrane-electrode assembly can restrain the problematical dry-out in the dry condition, and restrain or prevent a decrease of the power generating performance. Furthermore, the micro porous layer having the greater relative gas diffusion coefficient is provided on the cathode side to discharge water produced in the cathode through GDL and the separator on the cathode side. Therefore, even in the wet condition, the membrane-electrode assembly can drain the water from the inside of MEA (without deteriorating the cathode flooding), and improve the flooding resistance. Therefore, the MEA according to the present invention is superior in the dry out resistance and the flooding resistance both, and capable of enabling the fuel cell to generate power with superior performance in spite of changes of the humidity.

Hereinafter, embodiments according to the present invention are explained with reference to the drawings. The present invention is not limited to the following embodiments. Proportions of dimensions shown in the drawings may be exaggerated for convenience of explanation, and may be different from the actual proportions.

First, explanation is given, by using the drawings, the basic construction of a solid polymer or polymer electrolyte fuel cell to which the anode gas diffusion layer according to embodiment(s) of the present invention can be applied.

FIG. 1 is a schematic view showing the basic construction of a solid polymer fuel cell or polymer electrolyte fuel cell (PEFC) 1 according to a first embodiment of the present invention. PEFC 1 includes a polymer electrolyte membrane 2 and a pair of catalyst layers (anode catalyst layer 3a and cathode catalyst layer 3c) between which this membrane is sandwiched. This laminate structure of polymer electrolyte layer 2 and catalyst layers (3a and 3c) is sandwiched between a pair of gas diffusion layers (GDL) (anode gas diffusion layer 4a and cathode gas diffusion layer 4c). In this way, a membrane electrode assembly (MEA) 10 is constituted by the solid polymer electrolyte membrane 2, two catalyst layers (3a, 3c) and two gas diffusion layers (4a, 4c) in the laminated state.

The anode gas diffusion layer 4a includes an anode micro porous layer 5a and an anode gas diffusion layer base material or anode gas diffusion layer substrate 6a. Anode micro porous layer 5a is disposed in contact with the anode catalyst layer 3a. Similarly, the cathode gas diffusion layer 4c includes a cathode micro porous layer 5c and a cathode gas diffusion layer base material or cathode gas diffusion layer substrate 6c. Cathode micro porous layer 5c is disposed in contact with the cathode catalyst layer 3c.

In PEFC 1, MEA 10 is sandwiched between a pair of separators (anode separator 8a and cathode separator 8c). In FIG. 1, the separators (8a, 8c) are disposed at both ends of MEA 10. However, in the case of a fuel cell stack including a plurality of MEAs arranged in a stack, separators are generally used also for separation from an adjacent PEFC (not shown). In other words, in the fuel cell stack, MEAs are stacked sequentially through separators to form the stack. Actually, gas seal portion or portions are disposed between the separator (8a, 8c) and the polymer electrolyte membrane 2 and/or between PEFC 1 and an adjacent PEFC. In FIG. 1, the gas seal portion is omitted.

Separators (8a, 8c) are formed, for example, by press operation of thin sheet having a thickness equal to or smaller than 0.5 mm, into a convex and concave shape or corrugated shape as shown in FIG. 1. Convex portions of each separator (8a, 8c) as viewed from MEA 10 are in contact with MEA 10 to secure electrical connection with MEA 10. Concave portions of each separator (8a, 8c) as viewed from MEA 10 (interspace formed, between the separator and MEA, by the convex and concave shape of the separator) is arranged to function as a gas passage for conveying gas during operation of PEFC 1. Specifically, a fuel gas (hydrogen, for example) flows in a gas passage 9a formed by anode separator 8a, and an oxidizer gas (air, for example) flows in a gas passage 9c formed by cathode separator 8c.

Concave portions of separators (8a, 8c) as viewed from the side opposite to MEA are used as coolant passage(s) 11 for conveying a coolant (water, for example) to cool PEFC during operation of PEFC 1. Furthermore, the separators are normally provided with manifold(s) (not shown) used as connecting means for connecting unit cells in assembly of the stack. This arrangement can secure the mechanical strength of the fuel cell stack.

In the example shown in FIG. 1, the separators (8a, 8c) are formed in the non-flat, convex and concave shape. However, the separators are not limited to the convex and concave shape. The separators may be in the shape of a flat plate, a partly non-flat plate, or any other shape as long as the passages for the gases and coolant are ensured.

Figure 2:
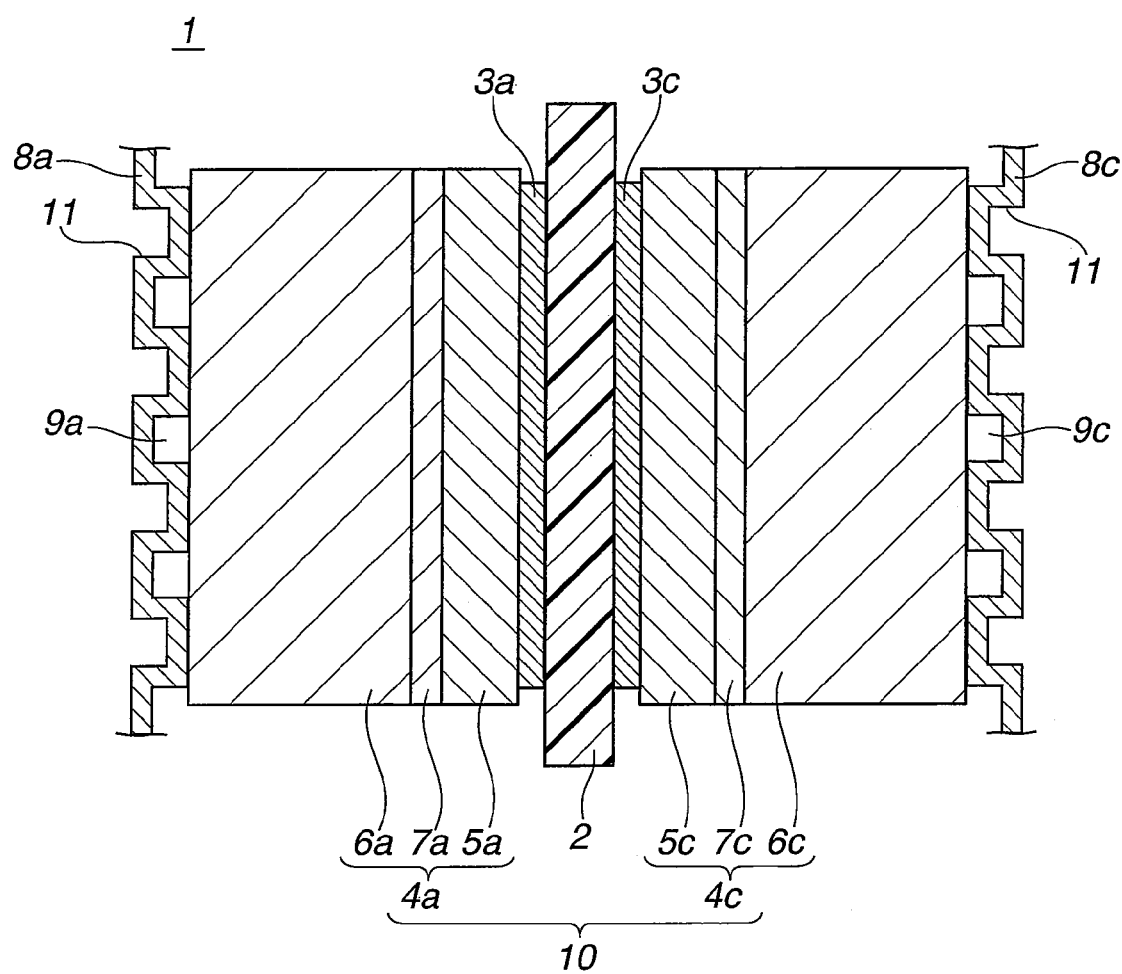
FIG. 2 is a schematic view showing the basic construction of a polymer electrolyte fuel cell (PEFC) according to a second embodiment of the present invention.

The anode gas diffusion layer 4a according to the present invention may further include an anode intermediate layer (MPL) 7a between the anode micro porous layer 5a and the anode gas diffusion layer substrate 6a, as shown in FIG. 2. Similarly, the cathode gas diffusion layer 4c may further include a cathode intermediate layer (MPL) 7c between the cathode micro porous layer 5c and the cathode gas diffusion layer substrate 6c, as shown in FIG. 2. FIG. 2 is a schematic view showing the basic construction of a polymer electrolyte fuel cell (PEFC) according to a second embodiment of the present invention, including intermediate layers (MPL). With the intermediate layer (MPL) formed between the micro porous layer and the gas diffusion layer substrate, it is easier to adjust the relative gas diffusion coefficient of each gas diffusion layer to a desired value. The anode gas diffusion layer 4a and cathode gas diffusion layer 4c according to the second embodiment are the same as the anode gas diffusion layer 4a and cathode gas diffusion layer 4c according to the first embodiment except for the addition of the anode intermediate layer (MPL) 7a and cathode intermediate layer (MPL) 7c.

It is not always necessary to provide the intermediate layer (MPL) on each of the anode and cathode sides. Therefore, the construction obtained by eliminating the anode intermediate layer (MPL) 7a from the construction shown in FIG. 2, and the construction obtained by eliminating the cathode intermediate layer (MPL) 7c from FIG. 2 are also encompassed in the present invention.

Hereinafter, parts are explained in detail. In the following explanation, when identical members are used both for the anode and cathode sides, a generic term is used by eliminating the terms of anode and cathode. For example, the anode catalyst layer and cathode catalyst layer are referred collectively to as "catalyst layer". However, it is not necessary to use identical members both for the anode and cathode sides, and the anode and cathode sides may be different from each other.

(Anode Micro Porous Layer)

As mentioned above, the anode gas diffusion layer 4a includes anode micro porous layer 5a and anode gas diffusion layer substrate 6a, and may further include the anode intermediate layer (MPL) 7a between anode micro porous layer 5a and anode gas diffusion layer substrate 6a, if required.

The relative gas diffusion coefficient of anode micro porous layer 5a is smaller than the relative gas diffusion coefficient of cathode micro porous layer 5c, by an amount or difference equal to or greater than 0.05 [–]. When this difference is smaller than 0.05 [–], it becomes difficult to restrain or prevent dry out at the anode in the dry condition, and flooding at the cathode in the wet condition both. Desirably, the difference between the relative gas diffusion coefficients of the anode and cathode micro porous layers [=(the relative gas diffusion coefficient of the cathode micro porous layer)–(the relative gas diffusion coefficient of the anode micro porous layer)] is greater than or equal to 0.05 [–]. More desirably, the difference is greater than or equal to 0.07 [–]. With the difference of such an amount, the membrane electrode assembly can restrain or prevent both the dry-out on the anode side in the dry condition and the flooding in the wet condition more effectively. No upper limit is imposed on the difference. No limitation is imposed on the method for controlling the difference between the relative gas diffusion coefficients of the anode and cathode micro porous layers. Preferably, as mentioned below in detail, it is possible to attain the desired difference by using flat or flaky conductive material for anode micro porous layer 5a, and granular conductive material for cathode micro porous layer 5c.

"The relative gas diffusion coefficients of the micro porous layers" on the anode and cathodes sides are measured in the following manner, in this description. "The relative gas diffusion coefficient" is a quotient obtained by dividing a gas diffusion coefficient Deff in the micro porous layer, by a gas diffusion coefficient Dbulk in the air or atmosphere, as expressed in a following mathematical expression 1.

$$D_{re}=D_{eff}/D_{bulk}=\epsilon/\tau$$ [Math. 1]

In this equation, $D_{re}$ is the relative gas diffusion coefficient [–]; $D_{eff}$ is an effective gas diffusion coefficient [m²/s]; $D_{bulk}$ is a gas diffusion coefficient [m²/s] in a bulk; $\epsilon$ is a porosity [–]; and $\tau$ is a tortuosity or bending degree [–].

The relative gas diffusion coefficient of anode micro porous layer 5a is not limited specifically as long as the relative gas diffusion coefficient of anode micro porous layer 5a is smaller than the relative gas diffusion coefficient of cathode micro porous layer 5c by the difference greater than or equal to 0.05 [–]. In consideration of the dry out resistance (the water vapor diffusion resistance), the relative gas diffusion coefficient of anode micro porous layer 5a is desirably in a range of 0.05~0.2 [–], and more desirably in a range of 0.1~0.2 [–]. Within such ranges, the membrane electrode assembly can restrain or prevent permeation of water/vapor through the anode micro porous layer, and therefore secure a sufficient amount of water to maintain the proton conductivity in the polymer electrolyte membrane and the catalyst layer by restraining or preventing drainage of water through GDL and the separator. Consequently, the MEA can restrain dry-out in the dry condition, and restrain or present lowering of the power generating performance. On the cathode side, on the other hand, the produced water is discharged sufficiently through GDL and the separator. Therefore, the membrane-electrode assembly can discharge water from MEA even in the wet condition (without deteriorating the cathode flooding), and improve the flooding resistance. Consequently, the MEA according to the present invention can attain both the dry-out resistance and the flooding resistance. No limitation is imposed on the method for controlling the relative gas diffusion coefficient of the anode micro porous layer as mentioned above. Preferably, as mentioned below in detail, it is possible to attain the desired anode micro porous layer by using flat or flaky conductive material for anode micro porous layer 5a.

The thickness of anode micro porous layer 5a is not limited as long as the dry-out resistance (the vapor diffusion resistance) is attained. The thickness of anode micro porous layer 5a is desirably in a range of 10~100 μm, more desirably in a range of 20~90 μm, and still more desirably in a range of 20~80 μm. With the thickness in such range, the anode micro porous layer can exhibit the dry-out resistance (vapor diffusion resistance) sufficiently. Moreover, it is possible to mitigate the bending stress to a compression force in a surface direction at the time of assembly of the stack, and to restrain or prevent plastic deformation of the anode micro porous layer. Therefore, it becomes possible to maintain the water holding or retaining characteristics of the polymer electrolyte membrane and catalyst layer sufficiently.

A tortuous factor or degree or bending degree of anode micro porous layer 5a is not limited as long as it is about a level capable of restraining or preventing plastic deformation. The tortuosity or bending degree of anode micro porous layer 5a is desirably in a range of 2.5~10, and more desirably in a range of 3~6. With such a tortuosity or bending degree, it is possible to improve a transport resistance of vapor in the anode micro porous layer effectively. Therefore, the anode micro porous layer can restrain or prevent the dry-out of the polymer electrolyte membrane and anode catalyst layer in the dry condition effectively. Moreover, it is possible to mitigate the bending stress to a compression force in the surface direction at the time of assembly of the stack, and to restrain or prevent plastic deformation of the anode micro porous layer. Therefore, it becomes possible to maintain the water holding or retaining characteristics of the polymer electrolyte membrane and catalyst layer sufficiently. In this description, the tortuosity or bending degree of the micro porous layer (τ) can be determined, as expressed by the mathematical expression 1, by determining the porosity (ε)/the relative gas diffusion coefficient (Dre). The porosity (ε) can be measured by mercury press-in method.

The porosity of anode micro porous layer 5a is not limited as long as it is about a level to exhibit the dry-out resistance (vapor diffusion resistance). The porosity of anode micro porous layer 5a is desirably in a range of 40~80%, and more desirably in a range of 50~75%. With such a porosity, the anode micro porous layer 5a can exhibit the dry out resistance (vapor diffusion resistance) sufficiently. In this description, the porosity of the micro porous layer can be measured by the mercury press-in method.

An effective water vapor diffusion coefficient (300K) of the anode micro porous layer 5a is not limited as long as it is about a level capable of exhibiting the dry-out resistance (vapor diffusion resistance). The effective vapor diffusion coefficient (300K) of anode micro porous layer 5a is preferably in a range of $1.5 \times 10^{-6} \sim 6.0 \times 10^{-6}$ [m$^2$/s], and more desirably in a range of $3.0 \times 10^{-6} \sim 5.0 \times 10^{-6}$ [m$^2$/s]. With such an effective vapor diffusion coefficient (300K), it is possible to improve the transport resistance of water vapor in the anode micro porous layer effectively. Therefore, it is possible to restrain or prevent dry-out of the polymer electrolyte membrane and anode catalyst layer in the dry condition effectively. In this description, the effective vapor diffusion coefficient in the micro porous layer is measured in the following method.

<Measurement of Effective Vapor Diffusion Coefficient (300K) of Micro Porous Layer(s)>

The gas diffusion coefficient is measured in the following manner by the use of an oxygen diffusion coefficient measuring apparatus disclosed in JP 2007-278826A (specifically in paragraphs [0027]~[0031]). The anode gas diffusion layer (a porous member P) is impregnated with a sufficient amount of water, and thereafter held at a porous member holder of an oxygen sensor. Next, the oxygen sensor holding the anode gas diffusion layer is set on an electronic balance, and measurement is performed. The oxygen sensor set on the electronic balance is enclosed in a sealed container so arranged that the temperature and humidity inside are adjustable. Outside the sealed container, there is provided a computing device for calculating the oxygen diffusion coefficient of the anode gas diffusion layer. The computing device is connected so that results of the measurement by the electronic balance are supplied to the computing device.

Then, variation with time, of the weight of water contained in the anode gas diffusion layer held by the porous member holder is measured by the electronic balance, and the results of the measurement are outputted to the computing device. Moreover, this computing device is connected with a receiver configured to receive a signal transmitted from a transmitter connected with the oxygen sensor, and to input the signal to the computing device.

When oxygen contained in the air in the sealed container permeates through the anode gas diffusion layer and reaches a negative electrode received in an electrolysis case, then the oxygen takes in electrons according to a chemical formula (1): $O_2 + 2H_2O + 4e^- \rightarrow 4OH^-$, and is reduced to hydroxide ions (OH$^-$). On the other hand, at a positive electrode of the oxygen sensor, there proceed a sequence of oxidizing reactions expressed by following chemical formulas (2)~(4).

[Chem. 1]

$$2Pb \rightarrow 2Pb^{2+} + 4e^- \quad (2)$$

$$2Pb^{2+} + 4OH^- \rightarrow 2Pb(OH)_2 \quad (3)$$

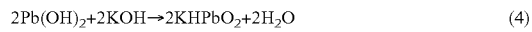

$$2Pb(OH)_2 + 2KOH \rightarrow 2KHPbO_2 + 2H_2O \quad (4)$$

Thus, the oxygen sensor outputs a current proportional to the quantity of oxygen having permeated through the anode gas diffusion layer. This output from the oxygen sensor is transmitted through the transmitter to the receiver and inputted to the computing device. In accordance with the output from the oxygen sensor, the computing device can determine the quantity of oxygen having permeated through the anode gas diffusion layer, and calculate the oxygen diffusion coefficient of the anode gas diffusion layer from this oxygen quantity.

The relative gas diffusion coefficient (D$_{re}$) is calculated by using the thus-determined oxygen diffusion coefficient. The effective vapor diffusion coefficient (300K) is set equal to a product obtained by multiplying the thus-obtained relative gas diffusion coefficient (D$_{re}$) by a vapor diffusion coefficient (D$_{bulk}$) $2.57 \times 10^{-5}$ [m$^2$/s](@300K) in bulk.

Anode micro porous layer 5a may be made of any material capable of exhibiting the dry-out resistance (vapor diffusion resistance). Preferably, the material of anode micro porous layer 5a contains flat or flaky conductive material which is electrically conductive. With this material, it is possible to improve the tortuosity or bending degree and vapor transport resistance of anode micro porous layer 5a. Although there is no special limitation, the anode micro porous layer 5a contains the flat conductive material in various forms as shown in FIG. 3, as example. FIG. 3 shows, in the form of a schematic sectional view, the basic structure of the anode micro porous layer according to the preferred embodiments.

Figure 3A:
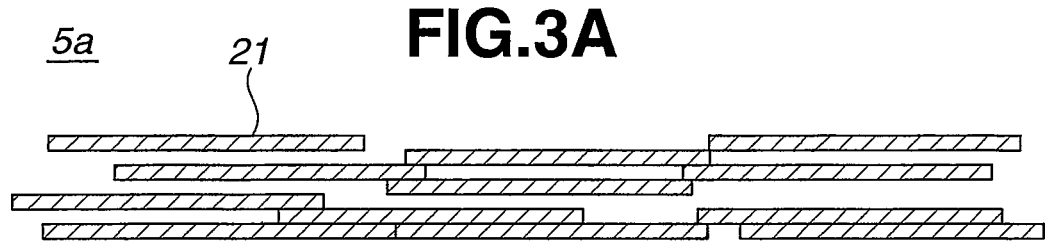
FIGS. 3A-3E schematically show a basic construction or constructions of an anode micro porous layer according to the preferred embodiment(s) of the present invention.

In the structure shown in FIG. 3A, the anode micro porous layer 5a is made of flat or flaky conductive material 21. A binder (not shown) is further included if required. In this case, flat conductive material 21 is arranged approximately in parallel in a surface direction along the surface. Thereby, the flat conductive material is arranged to restrain/prevent diffusion and discharge of water vapor in the thickness/surface direction(s) of anode micro porous layer 5a, and secure the electric conductivity in the surface direction. Therefore, the anode micro porous layer can secure the water retaining property of the solid polymer electrolyte membrane and catalyst layer sufficiently to retain the proton conductivity by restraining or preventing discharge of vapor from the anode side. Consequently, the anode micro porous layer can restrain the dry-out problematical in the dry condition and restrain or prevent lowering of the power generating performance.

Figure 3B:
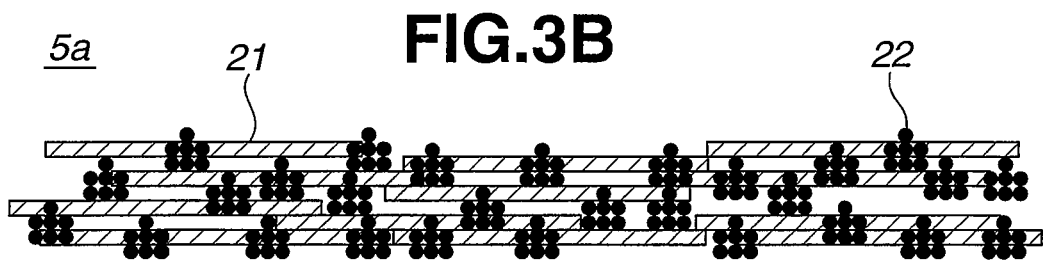

In the structure shown in FIG. 3B, the anode micro porous layer 5a is made of flat or flaky conductive material 21, and granular conductive material 22. The binder (not shown) is further included if required. In this case, flat conductive material 21 is arranged approximately in parallel in the surface direction along the surface. Thereby, the anode micro porous layer is constructed to restrain/prevent diffusion and discharge of water vapor in the thickness/surface direction(s) of anode micro porous layer 5a, and secure the conductivity in the surface direction. Therefore, the anode micro porous layer can secure the water retaining property of the solid polymer electrolyte membrane and catalyst layer sufficiently to retain the proton conductivity by restraining or preventing discharge of vapor from the anode side. Moreover, the granular conductive material 22 is interposed, as a conductive path material, in the flat conductive material 21. With the granular conductive material, it is possible to decrease the resistance in the thickness direction and improve the conductivity. At the same time, the granular conductive material 22 can function as a spacer material for improving the gas permeability in the thickness direction and the surface direction. Therefore, gas (fuel gas) can permeate smoothly from the separator's side. Consequently, it is possible to restrain the dry-out in the dry condition, restrain or prevent lowering of the power generating performance and improve the conductivity.

Figure 3C:
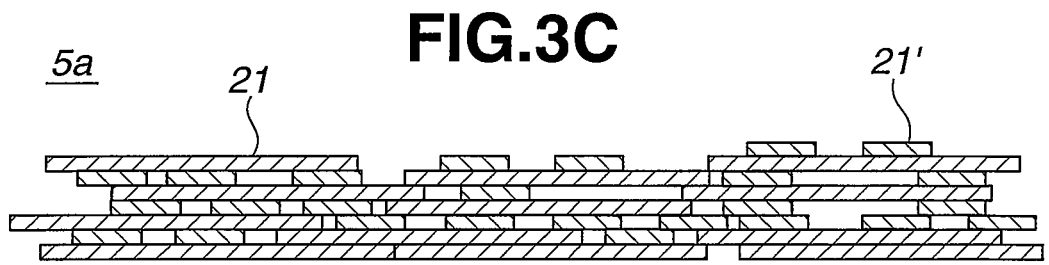

In the structure shown in FIG. 3C, the anode micro porous layer 5a is made of flat conductive materials 21 and 21' having different sizes. The binder (not shown) is further included if required. In this case, flat conductive materials 21 and 21' are arranged approximately in parallel in the surface direction along the surface. Thereby, the anode micro porous layer is arranged to restrain/prevent diffusion and discharge of water vapor in the thickness/surface direction(s) of anode micro porous layer 5a, and secure the conductivity in the surface direction. Therefore, the anode micro porous layer can secure the water retaining property of the solid polymer electrolyte membrane and catalyst layer sufficiently to retain the proton conductivity by restraining or preventing discharge of vapor from the anode side. Moreover, the flat conductive material 21' having a smaller size is interposed as a conductive path material in the flat conductive material 21. With this structure, it is possible to decrease the resistance in the thickness direction and improve the conductivity. At the same time, the flat conductive material 21' having the smaller size can function as a spacer material for improving the gas permeability in the thickness direction and the surface direction. Therefore, gas (fuel gas and oxidizer gas) can permeate smoothly from the separator's side. Consequently, it is possible to restrain the dry-out in the dry condition, restrain or prevent lowering of the power generating performance and improve the conductivity.

Figure 3D:
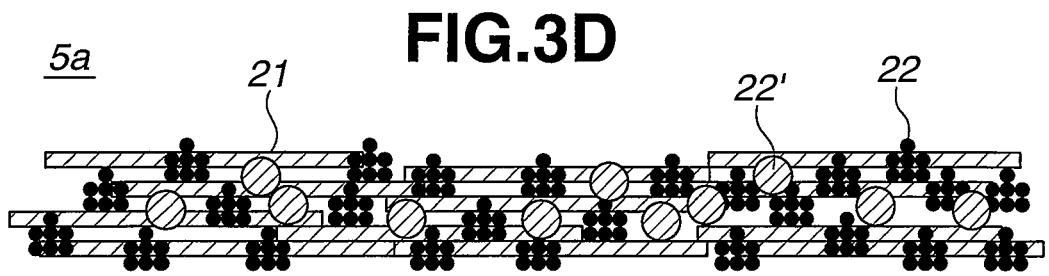

In the structure shown in FIG. 3D, the anode micro porous layer 5a is made of flat or flaky conductive material 21, and granular conductive materials 22 and 22' having different sizes. The binder (not shown) is further included if required. In this case, flat conductive material 21 is arranged approximately in parallel in the surface direction along the surface. Thereby, the anode micro porous layer is arranged to restrain/prevent diffusion and discharge of water vapor in the thickness/surface direction(s) of anode micro porous layer 5a, and secure the conductivity in the surface direction. Therefore, the anode micro porous layer can secure the water retaining property of the solid polymer electrolyte membrane and catalyst layer sufficiently to retain the proton conductivity by restraining or preventing discharge of vapor from the anode side. Moreover, the granular conductive materials 22 and 22' are interposed as conductive path material in the flat conductive material 21. With the granular conductive materials, it is possible to decrease the resistance in the thickness direction and improve the conductivity. Moreover, the granular conductive material 22' having a greater size can function as a spacer material for improving the gas permeability in the thickness direction and the surface direction. Therefore, gas (fuel gas) can permeate smoothly from the separator's side, and hence the solid polymer electrolyte membrane and catalyst layer can retain a sufficient amount of water even in a low humidity condition. Consequently, it is possible to restrain the dry-out in the dry condition, restrain or prevent lowering of the power generating performance and improve the conductivity.

Figure 3E:
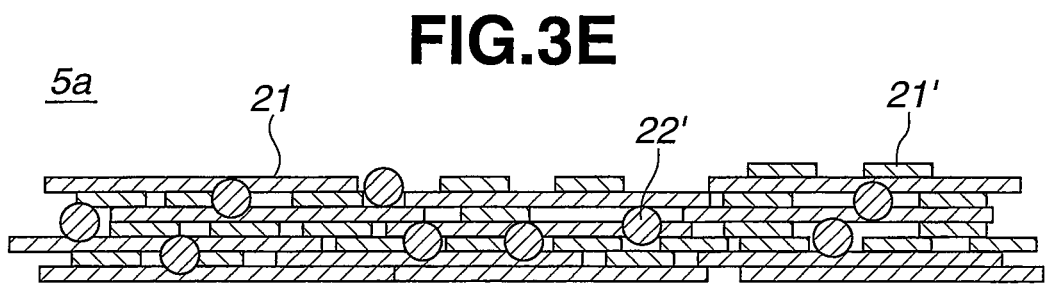

In the structure shown in FIG. 3E, the anode micro porous layer 5a is made of flat conductive materials 21 and 21' having different sizes, and a granular conductive material 22' having a greater size. The binder (not shown) is further included if required. In this case, flat conductive materials 21 and 21' are arranged approximately in parallel in a surface direction along the surface. Thereby, the anode micro porous layer is arranged to restrain/prevent diffusion and discharge of water vapor in the thickness/surface direction(s) of anode micro porous layer 5a, and secure the conductivity in the surface direction. Therefore, the anode micro porous layer can secure the water retaining property of the solid polymer electrolyte membrane and catalyst layer sufficiently to retain the proton conductivity by restraining or preventing discharge of vapor from the anode side. Moreover, the flat conductive material 21' having a smaller size and the granular conductive material 22' having a greater size are interposed as conductive path material in the flat conductive material 21. With this structure, it is possible to decrease the resistance in the thickness direction and improve the conductivity. Moreover, the flat conductive material 21' having the smaller size and the granular conductive material 22' having the greater size can function as a spacer material for improving the gas permeability in the thickness direction and the surface direction. Therefore, gas (fuel gas) can permeate smoothly from the separator's side, and hence the solid polymer electrolyte membrane and catalyst layer can retain a sufficient amount of water even in a low humidity condition. Consequently, it is possible to restrain the dry-out in the dry condition, restrain or prevent lowering of the power generating performance and improve the conductivity.

The structure of the anode micro porous layer is not limited to the forms shown in FIG. 3, merely as typical examples (in which the flat conductive material and the granulate conductive material are combined). For example, the flat conductive material 21' having a smaller size may be further incorporated in the anode micro porous layer shown in FIG. 3B, and/or the granular conductive material 22' having a greater size may be further incorporated.

In consideration of the dry-out resistance (vapor diffusion resistance), and the conductivity, the structures of FIGS. 3B~3E are preferable.

Figure 4A:
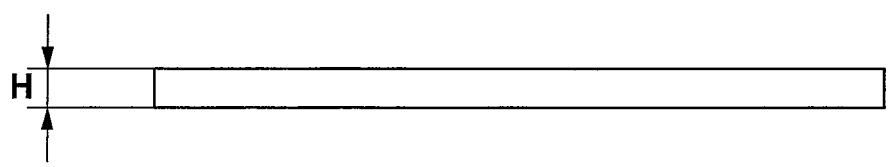
FIGS. 4A and 4B are side view and plan view for illustrating the shape of flat or flaky conductive material (flake graphite or scale-like graphite) forming the anode micro porous layer in an anode gas diffusion layer.
Figure 4B:
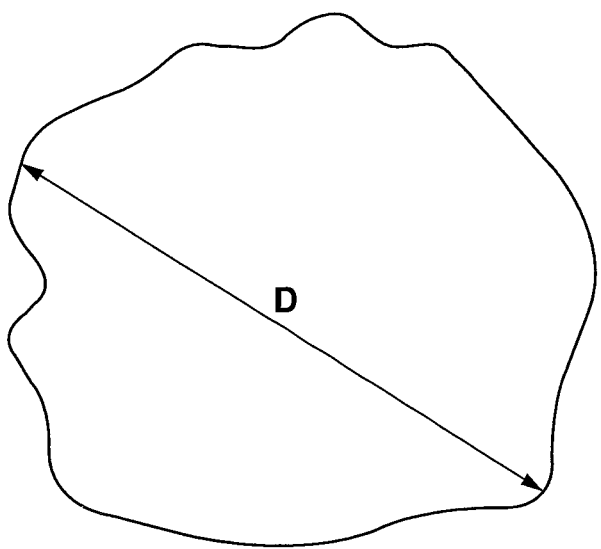

The flat or flaky conductive material, in these embodiments, contributes to improvement of dry-out resistance (vapor diffusion resistance) in the thickness direction and the surface direction of the anode micro porous layer, and reduction of the electric resistance (improvement of the electric conductivity) in the surface direction. The size of the flat conductive material is not specifically limited as long as the diffusion and discharge of vapor can be restrained or prevented in the thickness/surface directions of the anode micro porous layer. Concretely, the thickness of the flat or flaky conductive material is desirably in a range of 0.05~1 μm, and more desirably in a range of 0.05~0.3 μm. The aspect ratio of the flat or flaky conductive material is desirably greater than 3, more desirably in a range of 10~1000, and more desirably in a range of 10~1000. In other words, preferably the anode micro porous layer contains the flat or flaky conductive material having the thickness in the range of 0.05~1 μm, and the aspect ratio in the range of 10~1000. The flat or flaky conductive material having such a shape makes it possible to restrain or prevent diffusion and discharge of vapor in the thickness/surface direction and improve the transport resistance by arranging the flat conductive material in the surface direction along the surface of the anode micro porous layer. Accordingly, in the dry condition, the anode micro porous layer can restrain or prevent the dry-out in the polymer electrolyte membrane and the anode catalyst layer effectively. At the same time, the anode micro porous layer can secure the conductivity in the surface direction of the anode micro porous layer and improve the tortuosity or bending degree of anode micro porous layer. In this description, the thickness of the flat conductive material (and flake graphite or scalelike graphite as speculated below; the same applies hereinafter) is a thickness (H (μm) in FIG. 4A) of the flat conductive material as viewed from right sideway or from abeam as shown in FIG. 4A. When the thickness of the flat conductive material is not uniform, the intended thickness is a greatest thickness. Similarly, a flat diameter or flake diameter of the flat conductive material is a diameter (D μm in FIG. 4) viewed from just above the flat conductive material (flake graphite), as shown in FIG. 4B. When the flat diameter of the flat conductive material is not uniform, the intended diameter is a greatest diameter. The flat or flake diameter of the flat conductive material can be measured by a known method. In this description, values of the flat diameter are measured by Laser diffraction, scattering method. The flat diameter of the flat conductive material is not specifically limited. However, desirably, the flat diameter of the flat conductive material is in a range of 5~50 μm. With such a size, without exerting influence on the thickness of the anode micro porous layer, it is possible to improve the dry-out resistance (vapor diffusion resistance) in the thickness direction and surface direction of the anode micro porous layer, and to reduce the resistance (improve the conductivity) in the surface direction.

The aspect ratio of the flat conductive material, in this description, is defined as a ratio or proportion (D/H) of the flat diameter (D) of the flat conductive material determined as mentioned above, to the thickness (H) of the flat conductive material determined as mentioned above.

When the flat conductive materials 21 and 21' having different sizes are used as shown in FIGS. 3C and 3E, no special limitation is imposed on the sizes of flat conductive materials 21 and 21'. Preferably, the flat conductive materials 21 and 21' are within the above-mentioned desirable range of the thickness and the above-mentioned desirable range of the aspect ratio. Preferably, the thickness of the larger-sized flat conductive material 21 is within the above-mentioned desirable range and the aspect ratio is within the above-mentioned desirable range of the aspect ratio. The thickness of smaller-sized flat conductive material 21' is desirably within a range of 0.05~1 μm, and more desirably in a range of 0.05~0.5 μm. The aspect ratio of smaller-sized flat conductive material 21' is desirably within a range of 1~100, and more desirably in a range of 1~20. Although no special limitation is imposed on the flat diameter of smaller-sized conductive material 21', the flat diameter of smaller-sized conductive material 21' is desirably in range of 0.01~30 μm. With such sizes, the effects of the structures shown in FIG. 3C and FIG. 3E can be achieved effects efficiently.

The material used as the flat conductive material is not limited specifically as long as the material can retain or prevent diffusion and discharge of vapor in the thickness/surface directions of the anode micro porous layer 5a. Concretely, flake graphite or scalelike graphite is preferable as the flat conductive material. Flake graphite is crystalline and in the form of flakes or scalelike particles having a large aspect ratio (flat diameter D/thickness H). Flake graphite makes it possible to arrange the flat conductive material in the surface direction of the anode micro porous layer, and restrain or prevent diffusion and discharge of vapor in the thickness/surface directions. At the same time, flake graphite makes it possible to secure the electric conductivity in the surface direction of the anode micro porous layer, and to improve the tortuosity or bending degree of the anode micro porous layer. Moreover, flake graphite is inexpensive and highly conductive and capable of improving the power generating performance effectively. Thus, as the flat conductive material, specifically preferable material is flake graphite in the form of flaky or platy particles having the thickness in the range of 0.05~1 μm and the aspect ratio in the range of 10~1000.

In the case of the flat conductive material being flake graphite, though no special limitation is imposed, a specific surface area (BET specific surface area) of the flake graphite is desirably smaller than or equal to 2000 $m^2/g$, and more desirably in a range of 15~1000 $m^2/g$. By the use of flake graphite having the specific surface area in such a range, it is possible to further improve the dry-out resistance (vapor diffusion resistance) in the thickness/surface directions of the anode micro porous layer.

A blending quantity of the flat conductive material is not limited specifically as long as the dry-out resistance (vapor diffusion resistance) and the conductivity can be attained properly. Concretely, the blending quantity (the quantity of the solid content) of the flat conductive material is desirably in a range of 10~95 weight % with respect to all the components constituting the anode micro porous layer, more desirably in a range of 15~85 weight %, and still more desirably in a range of 40~70 weight %. When the flat conductive materials 21 and 21' having different sizes are used, the blending quantity is a total blending quantity of the flat conductive materials. With the thus-determined blending quantity, it is possible to arrange a sufficient amount of the flat conductive material in the surface direction of the anode micro porous layer, and restrain or prevent diffusion and discharge of vapor in the thickness/surface directions. Moreover, it is possible to secure the electric conductivity in the surface direction of the anode micro porous layer, and to improve the tortuosity or bending degree of the anode micro porous layer.

In the embodiments, the anode micro porous layer 5a may include a granular conductive material in addition to the flat conductive material. In this case, though there is no special limitation on the kind of the granular conductive material, examples of the granular conductive material are: carbon black such as oil furnace black, acetylene black, ketjen black, thermal black, channel black and lamp black; small-diameter flake or scalelike graphite; and carbon fiber. It is possible to adjust or prepare the granular conductive material by oneself or to use a commercially available conductive material (carbon material). Examples of the commercially available conductive material (carbon material) are: VULCAN (registered trademark), KETJENBLACK (registered trademark), and BLACK PEARLS (registered trademark). Carbon black may be graphitization-treated or graphitized. The granular conductive material may be in the form of single material or may be in the form of a mixture of two or more kinds of the granular conductive materials. When granular conductive materials 22 and 22' of different sizes are used as shown in FIG. 3D, carbon black is desirable as the larger-sized granular material 22, and acetylene black and ketjen black are more desirable. Graphitization-treated carbon black is desirable as the smaller-sized granular conductive material 22'.

No specific limitation is imposed on the size of the granular conductive material. When, for example, granular conductive materials 22 and 22' having different sizes, as shown in FIG. 3D, are used, the size of the larger sized granular conductive material 22 is desirably such that an average particle size (an average primary particle size, diameter) of the larger sized granular material 22 is greater than or equal to 10 nm and smaller than 5 μm. More desirably, the average particle size or diameter of the larger sized granular material 22 is 0.05~20 μm. As to the size of the smaller sized granular conductive material 22', the average particle or diameter size is desirably in a range of 1~10 nm, and more desirably in a range of 0.05~5 nm. The size of the granular conductive material can be measured by a known method. In this description, unless otherwise stated, the size of the granular conductive material is measured by the method using a means or instrument for observing such as a scanning electron microscope (SEM), or a transmission electron microscope (TEM), and calculating, as the size of the granular conductive material, an average of particle sizes of particles observed in several fields or scores of fields. The term "particle size or diameter" means a greatest distance among distances between two arbitrary points on the contour line of a particle. Moreover, in this description, "granular conductive material" is a conductive material having an aspect ratio (flat diameter D/thickness H) of about 1~3.

When carbon black is used as the granular conductive material, the specific surface area (BET specific surface area) of carbon black is not limited specifically, but the specific surface area of carbon black is desirably greater than or equal to 2000 $m^2/g$, and more desirably in a range of 15~1000 $m^2/g$. By the use of carbon black having such a specific surface area as the granular conductive material, it is possible to decrease the resistance in the thickness direction of the anode micro porous layer and further to improve the conductivity.

The blending quantity of the granular conductive material is not specifically limited as long as the gas permeability and the conductivity are improved properly. Concretely, the blending quantity of the smaller sized granular conductive material (the quantity of the solid content) is desirably in a range of 1~35 weight % with respect to the all the components constituting the anode micro porous layer. When the granular conductive materials 22 and 22' having different sizes are used, the blending quantity is a total blending quantity of the granular conductive materials. By intervening as the conductive path material in the flat conductive material, the granular conductive material mixed in the blending quantity in such a range can decrease the resistance in the thickness direction of the anode micro porous layer and improve the conductivity. Moreover, the granular conductive material can serve as the spacer material for improving the gas permeability in the thickness and surface directions, and achieve the satisfactory gas permeability. Specifically, when acetylene black is used as the granular conductive material, the blending quantity of acetylene black is desirably in a range of 5~40 weight % with respect to all the components constituting the anode micro porous layer. With such an amount, it is possible to form contact points and contact area sufficiently and thereby improve the conductivity. Moreover, acetylene black can serve as the spacer material improving the gas permeability in the thickness and surface direction, and achieve satisfactory gas permeability. When ketjen black is used as the granular conductive material, the blending quantity of ketjen black is desirably in a range of 1~20 weight % with respect to all the components constituting the anode micro porous layer, more desirably in a range of 3~15 weight % and still more desirably in arrange of 3~5 weight %. With such an amount, it is possible to form contact points and contact area sufficiently and thereby improve the conductivity. Moreover, ketjen black can serve as the spacer material improving the gas permeability in the thickness and surface directions, and achieve satisfactory gas permeability.

No specific limitation is imposed on the binder which can be used if required. It is possible to use known binders. Preferably, the binder is capable of performing the function of binding conductive material such as the flat conductive material and granular conductive material, and securing the strength of the anode micro porous layer, and performing the function as water repellant. Examples of the binder having such characteristics are: PTFE (polytetrafluoroethylene), Tetrafluoroethylene-hexafluoropropylene copolymer (FEP) and Tetrafluoroethylene-perfluoroalkylvinylether copolymers (PFA). No special limitation is imposed on the blending quantity of the binder (the quantity of the solid content) as long as the above mentioned effects can be achieved. Desirably, the blending quantity of the binder (the quantity of the solid content) is in a range of 5~40 weight % with respect to the all the components of the anode micro porous layer. With such an amount, the binder can bind conductive material, achieve a sufficient strength of the anode micro porous layer, and perform adequate water repelling function.

The anode gas diffusion layer according to the embodiment(s) has the structure including the anode micro porous layer 5a placed on the anode gas diffusion layer base or substrate 6a (or on the anode intermediate layer (MPL) 7a formed on the anode gas diffusion layer substrate 6a). With this structure, the MEA according to the present invention can achieve both the dry-out resistance and the flooding resistance, and improve the dry-out resistance (vapor diffusion resistance) on the anode side effectively. There are no special limitations on the dry-out resistance (vapor diffusion resistance) of the anode gas diffusion layer as long as the resistance against the dry-out is achieved sufficiently. However, the effective vapor diffusion coefficient (300K) is desirably in a range of $2\times10^{-6}$~$6.0\times10^{-6}$ [$m^2/s$], and more desirably in a range of $3.0\times10^{-6}$~$6.0\times10^{-6}$ [$m^2/s$]. The anode gas diffusion layer having the gas diffusion coefficient in such a range is superior in the dry-out resistance (vapor diffusion resistance) on the anode side.

The method of forming the anode micro porous layer is not limited specifically. The following is a preferred method of forming the anode micro porous layer according to the present invention. However, the present invention is not limited to the following method.

First, an ink including following materials is prepared: the flat conductive material, the granular conductive material according to the need, binder, surfactant and thickening agent. Next, the anode micro porous layer is formed on a heat stable or heat resisting support sheet by applying, on the heat resisting support sheet or holding sheet, the thus-prepared ink after operation of agitation and degassing, and then by performing operations of drying and baking or firing. As the heat resisting support sheet, it is possible to use known sheets including PTFE (polytetrafluoroethylene) sheet, polyester sheet such as PET (polyethyleneterephtalate) sheet, polyimide sheet, polypropylene sheet, polyethylene sheet, polysulphone sheet, and polytetrafluoroethylene sheet. Among these sheets, polyimide sheet can be used desirably. Although no specific limitation is imposed, the thickness of the heat resisting support sheet is desirably in a range of 10~100 μm. Instead of the heat resisting support sheet, it is optional to use a gas diffusion base layer or sheet (GDL with MPL) preliminarily formed with the gas diffusion layer substrate or the intermediate layer.

The condition for drying is not limited specifically in the above-mentioned method. However, a drying condition at 80~120° C. for 1~60 minutes, for example is desirable. The condition for baking or firing is not limited specifically either. However, a condition at 120~350° C. for 5~60 minutes, for example is desirable.

Then, the anode micro porous layer is removed from the heat resisting support sheet, and laminated on the gas diffusion layer base layer formed with the gas diffusion layer substrate or the intermediate layer, by hot press method, for example. In this way, the anode gas diffusion layer can be obtained. Alternatively, the anode gas diffusion layer can be obtained by using, as the heat resisting support sheet in the above-mentioned method, a gas diffusion base layer formed preliminarily with the gas diffusion layer substrate or the intermediate layer, and forming the anode micro porous layer on the heat resisting support sheet by applying the ink on the intermediate layer's side of the gas diffusion base layer formed with the gas diffusion layer substrate or the intermediate layer and performing drying and baking or firing operations. In this method, the drying and baking conditions are not specifically limited, but conditions similar to the above-mentioned conditions are desirable.

(Cathode Micro Porous Layer)

As mentioned before, the cathode gas diffusion layer 4c includes the cathode micro porous layer 5c and the cathode gas diffusion substrate 6c. According to the need, the cathode gas diffusion layer 4c may further include the cathode intermediate layer (MPL) 7c between the cathode micro porous layer 5c and cathode gas diffusion substrate 6c.

The relative gas diffusion coefficient of cathode micro porous layer 5c is not specifically limited as long as the relative gas diffusion coefficient of cathode micro porous layer 5c is greater than the relative gas diffusion coefficient of anode micro porous layer 5a by the difference greater than or equal to 0.05 [−]. In consideration of the flooding resistance, the relative gas diffusion coefficient of cathode micro porous layer 5c is desirably in a range of 0.1~0.8 [−], and more desirably in a range of 0.2~0.5 [−]. Within such ranges, the cathode micro porous layer 5c enables water produced in the cathode to permeate through the cathode micro porous layer 5c efficiently and to be discharged through GDL and separator. Accordingly, even in the wet condition, the MEA can cause water to be discharged from the inside of the MEA (without deteriorating the cathode flooding) and improve the flooding resistance. On the anode side, on the other hand, the anode micro porous layer 5a can restrain or prevent permeation of water/vapor through the anode micro porous layer effectively. Therefore, even in the dry (low humidity) condition, the membrane electrode assembly can secure a sufficient amount of water to maintain the proton conductivity in the solid polymer electrolyte membrane and the catalyst layer by restraining or preventing drainage of water through GDL and the separator. Consequently, the MEA according to the present invention can attain both the dry-out resistance and the flooding resistance. No specific limitation is imposed on the method for controlling the relative gas diffusion coefficient of the cathode micro porous layer as mentioned above. Preferably, as mentioned below in detail, it is possible to attain the desired cathode micro porous layer by using granular conductive material for cathode micro porous layer 5c.

The thickness of cathode micro porous layer 5c is not limited as long as the water produced in the cathode is drained efficiently and the flooding resistance is attained. The thickness of cathode micro porous layer 5c is desirably in a range of 10~100 μm, and more desirably in a range of 20~80 μm. With the thickness in such ranges, the water produced in the cathode is drained through the GDL and separator on the cathode side. Therefore, it is possible to drain water from the inside of the MEA even in the wet condition (without deteriorating the cathode flooding) and thereby improve the flooding resistance.

The tortuosity or bending degree of cathode micro porous layer 5c is not limited as long as it is about a level capable of restraining or preventing plastic deformation. The tortuosity degree of cathode micro porous layer 5c is desirably in a range of 1~15, more desirably in a range of 1.5~10, still more desirably in a range of 1.8~8 and still more desirably in a range of 3~6. With the tortuosity degree in such ranges, it is possible to mitigate the bending stress to a compression force in the surface direction at the time of assembly of the stack, and to restrain or prevent plastic deformation of the cathode micro porous layer.

The porosity of cathode micro porous layer 5c is not limited as long as it is about a level to exhibit the flooding resistance. The porosity of cathode micro porous layer 5c is desirably in a range of 40~80%, and more desirably in a range of 50~75%. With such a porosity, the cathode micro porous layer 5c enables the water produced in the cathode to be drained efficiently through the GDL and separator on the cathode side. Therefore, even in the wet condition, the cathode micro porous layer 5c makes it possible to discharge water from the inside of MEA (without deteriorating the cathode flooding) and thereby improve the flooding resistance.

The effective vapor diffusion coefficient (300K) of the cathode micro porous layer 5c is not limited as long as it is about a level capable of exhibiting the flooding resistance. The effective vapor diffusion coefficient (300K) of cathode micro porous layer 5c is desirably in a range of $1.5 \times 10^{-6} \sim 6.0 \times 10^{-5}$ [m$^2$/s], more desirably in a range of $5.0 \times 10^{-6} \sim 5.0 \times 10^{-5}$ [m$^2$/s], and still more desirably in a range of $1.0 \times 10^{-5} \sim 3.0 \times 10^{-5}$ [m$^2$/s]. With such an effective vapor diffusion coefficient (300K), it is possible to drain the water produced in the cathode efficiently through the GDL and separator on the cathode side. Therefore, it is possible to drain water from the inside of MEA even in the wet condition (without deteriorating the cathode flooding) and thereby further improve the flooding resistance.

Cathode micro porous layer 5c may be made of any material capable of exhibiting the flooding resistance. Preferably, the material of the cathode micro porous layer 5c contains granular conductive material, and more desirably carbon particles. With this material, it is possible to drain water produced in the cathode through interspace among the particles, to the outside of the system. Although there is no special limitation, as the carbon particles, it is possible to employ known material such as carbon black, graphite (inclusive of granular graphite) and expanded graphite. Specifically, because of its superior electron conductivity and greater specific surface area, it is possible to employ desirably carbon black such as oil furnace black, channel black, lamp black, thermal black and acetylene black. It is possible to employ as the carbon particles, commercially available products. Examples are oil furnace blacks such as Vulcan XC-72, VULCAN P, BLACK PEARLS 880, BLACK PEARLS 1100, BLACK PEARLS 1300, BLACK PEARLS 2000, and REGAL 400 produced by Cabot corporation; KETJENBLACK EC produced by LION Corporation, and #3150 and #3250 produced by Mitsubishi chemical corporation; and acetylene black such as DENKA black produced by DENKI KAGAKU KOGYO KABUSHIKI KAISHA. Moreover, besides carbon black, it is possible to use natural graphite, pitch, coke, and artificial graphite and carbon produced from organic compound such as polyacrylonitrile, phenol resin and furan resin. Moreover, it is optional to process the above mentioned carbon particles by graphitization treatment. The above-mentioned materials may be used singularly or in the form of mixture including two or more materials.

The particle size or diameter of the carbon particles is not limited as long as it is about a level capable of exhibiting the flooding resistance. Desirably, the average particle diameter or size (the average primary particle size, diameter) of the carbon particles is greater than or equal to 10 nm and smaller than 5 μm. More desirably, the average particle size of the carbon particles is 10~500 nm. The size of the carbon particles can be measured by a known method. In this description, unless otherwise stated, the same definition is used as the average particle size of the granular conductive material.

The specific surface area (BET specific surface area) of carbon particles is not limited specifically, but the specific surface area is desirably greater than or equal to 10~2000 m$^2$/g, and more desirably in a range of 20~1000 m$^2$/g. By the use of carbon particles having such a specific surface area in the cathode micro porous layer, it is possible to decrease the resistance in the thickness direction of the cathode micro porous layer 5c and further to improve the conductivity.

The blending quantity of the carbon particles is not specifically limited as long as the gas permeability and the conductivity are improved properly. Concretely, the blending quantity of the carbon particles is desirably in a range of 40~90 weight % and more desirably in a range of 50~85 weight % with respect to the all the components constituting the cathode micro porous layer. The carbon particles in such blending quantity can serve as the conductive path material and provide sufficient conductivity to the cathode micro porous layer. Therefore, the carbon particles can decrease the resistance in the thickness direction of the cathode micro porous layer and improve the conductivity. Moreover, the carbon particles can improve the gas permeability in the thickness and surface directions, and achieve the satisfactory gas permeability by allowing passage of water/vapor and oxidizer gas among the carbon particles. Specifically, when acetylene black is used as the carbon particles, the blending quantity of acetylene black is desirably in a range of 50~85 weight % with respect to all the components constituting the cathode micro porous layer. With such an amount, it is possible to form contact points and contact area sufficiently and thereby improve the conductivity. Moreover, acetylene black can allow water/vapor and oxidizer gas to pass among the carbon particles, thereby improve the gas permeability in the thickness and surface directions, and achieve satisfactory gas permeability. When ketjen black is used as the carbon particles, the blending quantity of ketjen black is desirably in a range of 50~85 weight % with respect to all the components constituting the cathode micro porous layer. With such an amount, it is possible to form contact points and contact area sufficiently and thereby improve the conductivity. Moreover, ketjen black can allow water/vapor and oxidizer gas to pass among the carbon particles, thereby improve the gas permeability in the thickness and surface directions, and achieve satisfactory gas permeability.

No special limitation is imposed on the binder which can be used if required. It is possible to use known binders. Preferably, it is possible to use the examples of the binder for the anode micro porous layer. No special limitation is imposed on the blending quantity of the binder (the quantity of the solid content) as long as the above mentioned effects can be achieved. Desirably, the blending quantity of the binder is in a range of 10~60 weight % with respect to the all the components of the cathode micro porous layer. With such an amount, the binder can bind particles of conductive material, achieve a sufficient strength of the cathode micro porous layer, and perform adequate water repelling function.

The cathode gas diffusion layer according to the embodiment(s) has the structure including the cathode micro porous layer 5c placed on the cathode gas diffusion layer base or substrate 6c (or on the cathode intermediate layer (MPL) 7c formed on the cathode gas diffusion layer substrate 6c). With this structure, the MEA according to the present invention can achieve both the dry-out resistance and the flooding resistance, and improve the flooding resistance on the cathode side effectively. There are no special limitations on the flooding resistance of the cathode gas diffusion layer as long as water produced in the cathode can be discharged sufficiently. However, the effective vapor diffusion coefficient (300K) is desirably in a range of $1.5 \times 10^{-6} \sim 6.0 \times 10^{-5}$ [m$^2$/s], more desirably $5.0 \times 10^{-6} \sim 5.0 \times 10^{-5}$ [m$^2$/s] and more desirably in a range of $1.0 \times 10^{-5} \sim 3.0 \times 10^{-5}$ [m$^2$/s]. The cathode gas diffusion layer having the gas diffusion coefficient in such a range is superior in the flooding resistance on the cathode side.

The method of forming the cathode micro porous layer is not limited specifically. The following is a preferred method of forming the cathode micro porous layer according to the present invention. However, the present invention is not limited to the following method.

First, an ink including following materials is prepared: the carbon particles, binder, surfactant, and thickening agent. Next, the cathode micro porous layer is formed on a heat stable or heat resisting support sheet by applying, on the heat resisting support sheet, the thus-prepared ink after operation of agitation and degassing, and then by drying and baking or firing. The heat resisting support sheet is not limited specifically. It is possible to use the examples of the heat resisting support sheet for the anode micro porous layer. Although no specific limitation is imposed, the thickness of the heat resisting support sheet is desirably in a range of 10~100 μm. Instead of the heat resisting support sheet, it is optional to use a gas diffusion base layer or sheet (GDL with MPL) preliminarily formed with the gas diffusion layer substrate or the intermediate layer.

The condition for drying is not limited specifically in the above-mentioned method. However, a drying condition at 60~150° C. for 1~60 minutes, is desirable, for example. The condition for baking or firing is not limited specifically either. However, a condition at 120~350° C. for 5~60 minutes is desirable, for example.

Then, the cathode micro porous layer is peeled off from the heat resisting support sheet, and laminated on the gas diffusion layer base layer formed with the gas diffusion layer substrate or the intermediate layer by hot press method, for example. In this way, the cathode gas diffusion layer can be obtained. Alternatively, the cathode gas diffusion layer can be obtained by using, as the heat resisting support sheet in the above-mentioned method, a gas diffusion base layer preliminarily formed with the gas diffusion layer substrate or the intermediate layer, and forming the anode micro porous layer on the heat resisting support layer, by applying the ink, directly, on the intermediate layer's side of the gas diffusion base layer formed with the gas diffusion layer substrate or the intermediate layer and performing drying and baking operations. In this method, the drying and baking conditions are not specifically limited, but conditions similar to the above-mentioned conditions are desirable.

(Gas Diffusion Layer Substrate)

As the gas diffusion layer substrate which can be used in the anode and cathode gas diffusion layers, it is possible to employ known materials with no specific limitation. Examples are: conductive and porous material in the form of sheet such as carbon paper, carbon fabric of carbon fiber such as carbon cloth, product like paper produced by paper making process, felt and nonwoven fabric; and other material such as mesh made of metallic material, expand metal, and etching plate. The thickness of the gas diffusion layer substrate may be determined appropriately in consideration of the desired characteristics. Desirably, the thickness of the gas diffusion layer substrate is in a range of about 30~500 µm. With such a thickness, it is possible to achieve the mechanical strength and permeability of gas and water sufficiently. The gas diffusion layer substrate may include water repellant in order to increase the water repelling property and thereby to prevent the flooding. Although there is no special limitation on the water repellent, examples of the water repellant are: fluorine based polymer material or fluoropolymer such as polytetrafluoroethylene (PTFE), polyvinylidene fluoride (PVdF), polyhexafluoropropylene, and tetrafluoroethylene-hexafluoropropylene copolymer (FEP); polypropylene, and polyethylene. It is possible to employ a general water repellant treatment with no specific limitation. For example, the gas diffusion layer substrate is immersed in a dispersion liquid of the water repellant, and thereafter the gas diffusion layer substrate is heated and dried by an oven, for example. Specifically, it is possible to use a sheet member formed by impregnating a porous body of polytetrafluoroethylene (PTFE) with carbon particles, and sintering the impregnated porous body. The form of a sheet makes it possible to simplify the production process and facilitate operations of handling and assembly at the time of laminating parts of a fuel cell. In dependence on the water discharging property of the MEA and the surface conditions of the separator, it is optional to omit the water repellant treatment of the gas diffusion layer substrate or to perform hydrophilic treatment.

Moreover, it is optional to use a combination of the gas diffusion layer substrate and a micro porous layer. In this case, the method of forming the micro porous layer on the gas diffusion layer substrate is not limited specifically. In one method as an example, a slurry is prepared by dispersing carbon particles, water repellant etc., in a solvent such as water, perfluorobenzene, dichloropentafluoropropane, alcohol solvent such as methanol and ethanol. Then, the thus-prepared slurry is applied on the gas diffusion layer substrate and dried. Alternatively, the slurry is first dried and pulverized into powder, and the powder is applied on the gas diffusion layer. Thereafter, it is desirable to perform a heat treatment at about 250~400° C. by the use of muffle furnace or furnace for firing or baking. Alternatively, it is possible to use a commercially available product in which a micro porous layer is formed on a gas diffusion layer substrate.

(Intermediate Layer (MPL))

As mentioned before, the anode gas diffusion layer and/or cathode gas diffusion layer may include an intermediate layer (MPL) if necessary. Although there is no specific limitation, the intermediate layer is preferably formed to have a greater gas diffusion coefficient. With the intermediate layer (MPL) of such a type, it is possible to further improve the gas permeability and achieve the power generating performance both in the dry and wet conditions more effectively. Although there is no specific limitation, the intermediately layer (MPL) can comprise carbon particles or aggregate of carbon particles, including water repellant if required. Although there is no special limitation, as the carbon particles, it is possible to employ known material such as carbon black, graphite (inclusive of granular graphite) and expanded graphite. Specifically, because of its superior electron conductivity and greater specific surface area, it is possible to employ desirably carbon black such as oil furnace black, channel black, lamp black, thermal black and acetylene black. It is possible to employ, as the carbon particles, commercially available products. Examples are oil furnace blacks such as Vulcan XC-72, VULCAN P, BLACK PEARLS 880, BLACK PEARLS 1100, BLACK PEARLS 1300, BLACK PEARLS 2000, and REGAL 400 produced by Cabot Corporation; KETJENBLACK EC produced by LION Corporation, and #3150 and #3250 produced by Mitsubishi Chemical Corporation; and acetylene black such as DENKA black produced by DENKI KAGAKU KOGYO KABUSHIKI KAISHA. Moreover, besides carbon black, it is possible to use natural graphite, pitch, coke, and artificial graphite and carbon produced from organic compound such as polyacrylonitrile, phenol resin and furan resin. Moreover, it is optional to process the above mentioned carbon particles by graphitization treatment to improve the corrosion resistance. The above-mentioned materials may be used singularly or in the form of mixture including two or more materials.

The particle size or diameter of the carbon particles is desirably in a range of 10~100 nm. With the particle size in such a range, it is possible to improve the gas diffusion coefficient, to achieve higher discharging performance with capillary action, and to improve the contactability with the catalyst layer. The shape of particles of the conductive carrier is not limited specifically. The particles may be in various forms. For example, the particle may be spherical, rod-like, needle-like, plate-like, columnar, indeterminate in form, flaky or scale-like, and spindle-like. In this description, "particle size of conductive carrier particles" is an average secondary particle size of the conductive carrier particles. The average secondary particle size of the conductive carrier particles is measured by the method using a means or instrument for observing such as the scanning electron microscope (SEM), or the transmission electron microscope (TEM), and calculating, as the average secondary parcel size, an average of particle sizes of particles observed in several fields or scores of fields.

Preferably, the intermediate layer (MPL) includes water repellant in order to increase the water repelling property and thereby to prevent the flooding. Although there is no special limitation on the water repellent, examples of the water repellant are: fluorine based polymer material or fluoropolymer such as polytetrafluoroethylene (PTFE), polyvinylidene fluoride (PVdF), polyhexafluoropropylene, and tetrafluoroethylene-hexafluoropropylene copolymer (FEP); and thermoplastic resin such as polyethylene and polypropylene. Especially, the fluorine-based polymer material is desirable because of its superior water repelling property and corrosion resistance at the time of electrode reaction. As to the mixing ratio between the carbon particles and the water repellant in the intermediate layer (MPL), an excessive amount of the carbon particles might impede attainment of an intended water repelling property, and an excessive amount of the water repellant might deteriorate the electron conductivity. Accordingly, the mixing ration of the carbon particles and water repellant in the intermediate layer (MPL) is desirably in a range of 90:10~40:60 in terms of ratio by weight approximately. The thickness of the intermediate layer (MPL) can be determined appropriately in consideration of the obtained anode gas diffusion layer.

In the intermediate layer (MPL), the carbon particles may be bound by a binder. Examples of the binder which can be used in the intermediate layer are: fluorine-based polymer such as polytetrafluoroethylene (PTFE), polyvinylidene fluoride (PVDF), polyhexafluoropropylene, and tetrafluoroethylene-hexafluoropropylene copolymer (FEP); thermosetting resin such as phenol resin, melamine resin and polyamide resin; and thermoplastic resin such as polypropylene and polyethylene. The binder is partly overlapped with the above-mentioned water repellant. Therefore, the use of a binder having the water repelling property is preferable. Especially, the fluorine-based polymer is preferable because of its superior water repelling property and corrosion resistance at the time of electrode reaction. Specifically, polytetrafluoroethylene (PTFE) is preferable. By using a binder having a water repelling property, it is possible to impart the water repelling property to pores (among carbon particles) in the intermediate layer (MPL) and thereby to improve the water discharging performance. It is possible to use only one of these binders or to use two or more together. Moreover, it is optional to use polymer other than these examples.

The content of the binder in the intermediate layer (MPL) can be adjusted so as to provide a desired characteristic to the porous structure in the intermediate layer (MPL). Concretely, the content of the binder is desirably in a range of 5~60 weight %, more desirably in a range of 10~50 weight %, and still more desirably in a range of 12~40 weight % with respect to the total weight of the intermediate layer (MPL). The carbon particles can be bound together adequately with the blending proportion of the binder greater than or equal to 5 weight %. With the blending proportion of the binder smaller than or equal to 60 weight %, it is possible to prevent an increase of the electric resistance of the intermediate layer (MPL).

The thickness of the intermediate layer (MPL) is not limited specifically. The thickness of the intermediate layer (MPL) can be determined appropriately in consideration of the characteristics of the anode gas diffusion layer. The thickness of the intermediate layer (MPL) is desirably in a range of 3~500 μm, more desirably in a range of 5~300 μm, and still more desirably in a range of 10~150 μm and a range of 20~100 μm is specifically desirable. With the intermediate layer in such a thickness range, it is possible to control the balance between the mechanical strength and the permeability of gas and water.

(Polymer Electrolyte Membrane)

The polymer electrolyte membrane 2 has a function to cause protons produced in the anode catalyst layer 3a at the time of operation of PEFC 1, selectively to permeate in the thickness direction of the membrane to the cathode catalyst layer 3c. Moreover, polymer electrolyte membrane 2 functions as a partition for separating the fuel gas supplied to the anode side and the oxidizer gas supplied to the cathode side from each other to prevent these gases from being mixed together.

The types of solid polymer electrolyte membrane 2 are largely classified into a fluorine polymer electrolyte membrane and a hydrocarbon polymer electrolyte membrane according to the type of ion exchange resin constituting the membrane. Examples of the ion exchange resin forming the fluorine polymer electrolyte membrane are: perfluorocarbonsulfonic acid based polymer such as Nafion (registered trademark, made by DuPont Corporation), Aciplex (registered trademark, made by Asahi Kasei Corporation), and Flemion (registered trademark, made by Asahi Glass Co., Ltd.), perfluorocarbon phosphonic acid based polymer, trifluorostyrene sulfonic acid based polymer, ethylenetetrafluoroethylene-g-styrene sulfonic acid based polymer, ethylene-trarafluoroethylene copolymer, and polyvinylidene fluoride-perfluorocarbon sulfonic acid based polymer. From viewpoint of the heat resistance or stability and the chemical stability for improving the power generating performance, these fluorine based polymers are preferable for the electrolyte membrane. Specifically preferable example is a fluorine based polymer electrolyte membrane of perfluorocarbonsulfonic acid based polymer.

Examples of the hydrocarbon type electrolyte are: sulfonated polyether sulfone (S-PES), sulfonated polyaryl ether ketone, sulfonated polybenzimidazole alkyl, phosfonated polybenzimidazole alkyl, sulfonated polystyrene, sulfonated polyether ether ketone (S-PEEK), and sulfonated polyphenylene (S-PPP). The electrolyte membrane of these hydrocarbon based polymers is advantageous in the production because the raw material is low in cost, the production process is simple and selection of the materials is wide.

The above mentioned ion exchange resins may be used singularly with only one kind or may be used in combination of two or more kinds. Moreover, it is possible to use other material beyond limitation to the above-mentioned materials.

The thickness of the polymer electrolyte membrane can be determined appropriately in consideration of characteristics of the produced fuel cell without specific limitation. The thickness of the electrolyte layer is generally about 5~300 μm. With the electrolyte layer having the thickness in such a range, it is possible to control the balance among the strength at the time of production of the membrane, the durability, and the output characteristic adequately.

(Catalyst Layer)

The catalyst layer (anode catalyst layer 3a, cathode catalyst layer 3c) is a layer in which a battery reaction proceeds actually. Specifically, an oxidation reaction of hydrogen proceeds in the anode catalyst layer, whereas a reduction reaction of oxygen proceeds in the cathode catalyst layer.

The catalyst layer contains a catalyst component, an electrically conductive carrier carrying the catalyst component (conductive carrier), and an electrolyte. Hereinafter, a composite substance including the catalyst component carried by the catalyst carrier is referred to also as o red to, a composite The catalyst component used in the anode catalyst layer is not particularly limited as far as it has a catalytic action to oxidation reaction of hydrogen, so that known catalysts can be similarly used. Furthermore, the catalyst component used in the cathode catalyst layer is not particularly limited either as far as it has a catalytic action to reduction reaction of oxygen, so that known catalysts can be similarly used. Specifically, the catalyst component can be selected from metals such as platinum, ruthenium, iridium, rhodium, palladium, osmium, tungsten, lead, iron, chromium, cobalt, nickel, manganese, vanadium, molybdenum, gallium, aluminum and the like, and alloys of these metals.

The catalyst component containing at least platinum is preferably used in order to improve a catalytic activity, a poisoning resistance to carbon monoxide and the like, and a heat resistance. The composition of the above-mentioned alloy preferably contains 30 to 90 atomic % of platinum and 10 to 70 atomic % of a metal to be alloyed with platinum, according to kinds of metals to be alloyed with platinum. The term "alloy" is a general term meaning substances having metallic properties and comprising a metal element and one or more additional metallic or nonmetallic element(s). There are various alloys having different structures, such as an eutectic alloy in the form of a mixture in which constituent elements form separate crystals, an alloy in the form of a solid solution in which constituent elements are completely melted together, and an alloy in which constituent elements form an intermetallic compound or a compound of metal and non-metal. Any one of these can be used for the present application. In this case, it is possible to select appropriately from these substances for the catalyst component for the anode catalyst layer and the catalyst component for the cathode catalyst layer. In this description, the catalyst components of the anode catalyst layer and the cathode catalyst layer are explained and defined in the same manner unless otherwise stated, and therefore referred to collectively as "catalyst component". However, the catalyst components of the anode catalyst layer and the cathode catalyst layer are not required to be the same and therefore may be suitably selected so as to make the desired effects as mentioned above.

The shape and size of the catalyst component are not particularly limited so that it is possible to employ the shape and size similar to those of known catalyst components. For example, the shape of the catalyst component may be granular, flaky or scale-like or lamellar. The granular shape is preferable. In this connection, the mean or average particle diameter of catalyst particles is desirably 1 to 30 nm, more desirably 1 to 10 nm, still more desirably 1 to 5 nm, and still more desirably 2 to 4 nm. If the mean particle diameter of the catalyst particles is within such a range, a balance between a catalyst utilization factor in connection with an effective electrode area where an electrochemical reaction proceeds and a convenience in catalyst-carrying can be suitably controlled. It is to be noted that "the average or means particle diameter of the catalyst particles" can be measured as a crystal size determined from the half bandwidth of a diffraction peak of the catalyst component in a X-ray diffraction or as a mean value of the particle diameter of the catalyst component obtained from the image of a transmission electron microscope (TEM).

The above-mentioned catalyst component is contained, as an electrode catalyst carried by the conductive carrier, in a catalyst ink.

The electrically conductive carrier functions as a carrier for carrying the above-mentioned catalyst component, and as an electron conductive path having a role in electron transfer between the catalyst component and another component. As the electrically conductive carrier, it is possible to use a material having a specific surface area for carrying the catalyst particles in a desired dispersed state and a sufficient electron conductivity as an electric collector. A material including, as a main component, carbon is preferable. Specifically, examples are carbon particles of carbon black, activated carbon, coke, natural graphite, artificial graphite. It is to be noted that the statement "main component is carbon" means that carbon atoms are contained as the main component, and this concept includes both of material including only carbon atoms, and material substantially made of carbon atoms. In some cases, element(s) other than carbon may be contained in the electrically conductive carrier in order to improve the characteristics of the fuel cell. It is to be noted that "substantially made of carbon atoms" means that about 2 to 3 weight % or less of impurity may be contained.

The BET specific surface area of the conductive carrier may be set at a value sufficient to carry the catalyst component in the highly dispersed state. The BET specific surface area of the conductive carrier is desirably in a range 20~1600 m$^2$/g, and more desirably in a range 80~1200 m$^2$/g. With the specific surface area within such a range, the catalyst component and the polymer electrolyte can be dispersed sufficiently on the conductive carrier to provide sufficient power generating performance, and the catalyst component and the polymer electrolyte can be utilized effectively.

The size of the electrically conductive carrier is not particularly limited. However, from a viewpoint of the ease of carrying, the utilization rate of the catalyst, and the control of the thickness of the electrode catalyst layer within an adequate range, the average or mean particle diameter is desirably in a range of 5 to 200 nm, and more desirably in a range of about 10 to 100 nm.

In the electrode catalyst in which the catalyst component is carried by the conductive carrier, the quantity of the catalyst component carried by the carrier is desirably in a range of 10 to 80 weight %, and more desirably in a range of 30 to 70 weight % with respect to the whole quantity of the electrode catalyst. With the quantity of the catalyst component within such a range, the balance between a dispersion degree of the catalyst component on the conductive carrier and the performance of the catalyst can be suitably controlled. The quantity of the carried catalyst component can be measured by an inductively coupled plasma emission spectrochemical analysis method (ICP).

The catalyst layer includes ion conductive polymer electrolyte in addition to the electrode catalyst. The above-mentioned polymer electrolyte is not limited specifically, and known techniques can be used appropriately. For example, the above-mentioned ion exchange resin constituting the catalyst layer can be added, as the polymer electrolyte, to the catalyst layer.

The above-mentioned polymer electrolyte is not limited specifically, and known technique can be used appropriately. The types of the polymer electrolyte are largely classified into a fluorine polymer electrolyte and a hydrocarbon polymer electrolyte according to the type of constituent ion exchange resin. Explanation on the fluorine polymer electrolyte and hydrocarbon polymer electrolyte is omitted since the explanation is the same as the explanation in the above-mentioned polymer electrolyte membrane. Preferably, the polymer electrolyte contains fluorine atoms because of its superior heat stability and chemical stability. Specifically, desirable examples of the fluorine based electrolyte are: Nafion (registered trademark, made by DuPont Corporation), Aciplex (registered trademark, made by Asahi Kasei Corporation), and Flemion (registered trademark, made by Asahi Glass Co., Ltd.).

Furthermore, the catalyst component can be carried on the conductive carrier, by known methods such as impregnation method, liquid phase reduction carrying method, evaporation to dryness method, colloid adsorption method, evaporative decomposition method, and reversed micelle (microemulsion) method. Alternative, it is possible to use a commercially available product as the electrode catalyst.

In one method according to the present invention, the catalyst layer is formed by coating the polymer electrolyte membrane surface with a catalyst ink including the electrode catalyst, polymer electrolyte and solvent, as mentioned before. In this case, the solvent is not limited specifically, and it is possible to use, as the solvent, ordinary solvent generally used for forming a catalyst layer. Specifically, it is possible to use water and lower alcohol such as cyclohexanol, ethanol and 2-propanol. The quantity of the solvent to be used is not limited specifically, and the solvent can be used in a quantity as in known technique. In the catalyst ink, the quantity of the electrode catalyst is determined appropriately within a range capable of performing the intended operation, that is, an operation of catalyst for the oxidation reaction of hydrogen (on the anode side) or the reduction reaction of oxygen (on the cathode side). In the catalyst ink, the quantity of the electrode catalyst is desirably in a range of 5~30 weight %, and more desirably in a range of 9~20 weight %.

The catalyst ink used in the present invention may include a thickening agent or viscosity improver. The use of the thickening agent is effective when the catalyst ink cannot be applied satisfactorily on a mount board or mount paper for transfer printing. The usable thickening agent is not limited specifically, and it is possible to use known thickening agent. Examples usable as the thickening agent here are: glycerin, ethylene glycol (EG), polyvinyl alcohol (PVA) and propylene glycol (PG). Among them, propylene glycol (PG) is preferable. The use of propylene glycol (PG) makes the boiling point of the catalyst ink higher, and decrease the solvent evaporating speed. Therefore, the addition of PG to the catalyst ink for forming the catalyst layer on the electrolyte membrane by the transfer printing method is effective for restraining the evaporation of solvent in the coated catalyst ink, and restraining or preventing crack from being formed in the catalyst layer after the drying operation. By transferring, to the membrane, the catalyst layer having little crack, it is possible to mitigate mechanical stress concentration in the membrane, and hence improve the durability of MEA. The quantity of the thickening agent is not limited as long as the above mentioned effects according to the present invention are not impeded. Preferably, the quantity of the thickening agent is in a range of 5~20 weight % with respect to the total weight of the catalyst ink.

The method of preparing the catalyst ink according to the present invention is not limited specifically as long as the catalyst ink is a mixture prepared by mixing the electrode catalyst, electrolyte and solvent, and adding the water repelling polymer and/or the thickening agent if required. In one example, the catalyst ink can be prepared by adding an electrolyte to a polar solvent, dissolving the electrolyte in the polar solvent by heating and stirring the liquid mixture of the electrolyte and the polar solvent, and thereafter adding the electrode catalyst. In another example, the catalyst ink can be prepared by dispersing/suspending the electrolyte in the solvent, and thereafter mixing the thus-prepared disperse suspension with the electrode catalyst. Alternatively, it is possible to directly use, in the above-mentioned method, a commercially available electrolyte solution of an electrolyte in a solvent (for example, Nafion solution of DuPont: Nafion is dispersed and suspended with a concentration of 5 wt %, in 1-propanol).

Each of the catalyst layers is formed by applying the catalyst ink on the polymer electrolyte membrane or the gas diffusion layer. In this case, the conditions for forming the cathode/anode catalyst layer on the polymer electrolyte membrane are not limited specifically, and a known method can be used similarly or with appropriate modification. For example, a method includes a coating operation of applying the catalyst ink on the polymer electrolyte membrane so as to obtain a desired thickness after drying, and a drying operation in a vacuum drier or at a reduced pressure, at a temperature in a range of 25~150° C., more desirably in a range of 60~120° C., for a duration in a range of 5~30 minutes, more desirably in a range of 10~20 minutes. In this method, if the thickness of the catalyst layer is not sufficient, the coating and drying operations are repeated.

The catalyst content ($mg/cm^2$) per unit catalyst coating area is not limited specifically. In consideration of sufficient dispersion of the catalyst on the carrier and the power generating performance, the catalyst content per unit catalyst coating area is desirably in a range of 0.01~1.0 $mg/cm^2$. However, in the case of the catalyst containing platinum or platinum containing alloy, the platinum content per unit catalyst coating area is desirably lower than or equal to 0.2 $mg/cm^2$. The use of platinum (Pt), platinum alloy and other expensive noble metal catalyst is a factor for increasing the cost of the fuel cell. Therefore, it is desirable to reduce the quantity of platinum (platinum content) to the above-mentioned range and reduce the cost. The lower limit is not limited specifically as long as the power generating performance is achieved. For example, the platinum content per unit catalyst coating area is greater than or equal to 0.01 $mg/cm^2$. More desirably, the platinum content per unit catalyst coating area is in a range of 0.05~0.20 $mg/cm^2$. For the measurement (verification) of the catalyst (platinum) content ($mg/cm^2$) per unit catalyst coating area, in this description, an inductively coupled plasma emission spectrometry (ICP) is employed. The catalyst (platinum) content ($mg/cm^2$) per unit catalyst coating area can be adjusted to a desired value readily by a person skilled in the art, by controlling the composition of the ink (catalyst concentration) and the quantity of coating.

The thickness of the catalyst layer (after drying) is desirably in a range of 0.5~30 μm, more desirably in a range of 1~20 μm, and still more desirably in a range of 1~5 μm. The above-mentioned range of the thickness is applied to both of cathode catalyst layer and the anode catalyst layer. The thicknesses of the cathode catalyst layer and anode catalyst layer may be equal to each other or may be unequal from each other.

(Production Method of Membrane Electrode Assembly)

The method for forming the membrane electrode assembly is not limited specifically, and it is possible to use known methods. For example, a method in one example includes an operation of forming a catalyst layer on an electrolyte membrane by transfer printing by hot press or coating, and an operation of joining a gas diffusion layer to the dried assembly of the catalyst layer and the electrolyte membrane. A method in another example includes an operation of forming two gas diffusion electrodes by applying and drying an anode catalyst layer and a cathode catalyst layer, respectively, on an anode micro porous layer of anode gas diffusion layer and a cathode gas diffusion layer (on a cathode micro porous layer when the cathode micro porous layer is included), and an operation of joining these two gas diffusion electrodes on both sides of the electrolyte membrane by hot press. The conditions of coating and joining such as the hot press can be adjusted appropriately in dependence on the type of the electrolyte (perfluorosulfonic acid type and hydrocarbon type) in the electrolyte membrane and the catalyst layer.

(Separator(s))

In a structure forming a fuel cell stack by connecting a plurality of unit cells such as unit cells of polymer electrolyte type in series, separators are used to connect the cells electrically in series. Moreover, the separators have a function as a partition separating the fuel gas, oxidizer gas and coolant from one another. To form passages for these fluids, each of the separators is preferably formed with gas passage or passages and coolant passage or passages. As the material of the separators, it is possible to use carbon such as dense carbon graphite and carbon plate, metal such as stainless metal, and other known material, with no specific limitation. The thickness and size of the separators and the shape and size of fluid passages formed in the separators can be determined appropriately with no specific limitation, in consideration of desired output performance of the fuel cell to be produced.

The type of the fuel cell is not limited specifically. Besides the polymer electrolyte fuel cell (PEFC) employed as an example, in the preceding explanation, it is possible to employ an alkali type fuel cell, a direct methanol type fuel cell and a micro fuel cell. Among them, the polymer electrolyte fuel cell is preferable because of its capability of reducing the size, enabling dense package, and increasing the output. The above-mentioned fuel cell is useful for a stationary power source as well as for a power source for a movable body such as a vehicle in which the mounting space is limited. Specifically, the above-mentioned fuel cell can be used desirably for a motor vehicle subjected to frequent start/stop of a system and output fluctuation.

The production method of the fuel cell is not limited specifically, and it is possible to use knowledge in known technique in the field of the fuel cell.

The fuel used in operation of the fuel cell is not limited specifically. Examples which can be used are: hydrogen, methanol, ethanol, 1-propanol, 2-propanol, 1-butanol, secondary butanol, tertiary butanol, dimethyl ether, diethyl ether, ethylene glycol and diethylene glycol. Among them, hydrogen and methanol are preferable because of capability of increasing output.

It is optional to form a fuel cell stack having a structure including a plurality of membrane electrode assemblies which are laminated through separators and connected in series, to achieve an intended voltage of the fuel cell. The shapes of fuel cells can be determined appropriately in consideration of intended battery characteristics such as voltage.

The above-mentioned PEFC and membrane electrode assembly employ the gas diffusion layer(s) capable of achieving both the dry out resistance and the flooding resistance. Therefore, the PEFC and membrane electrode assembly are not susceptible to humidity changes, and effective for providing satisfactory power generating performance.

PRACTICAL EXAMPLES

Following practical examples and comparative examples are used for explaining the effects of the present invention. However, the technical scope of the present invention is not limited to the following practical examples.

Practical Example 1

An ink was prepared. This ink comprises flaky or scale-like graphite (flat diameter (D): 15 μm, thickness (H): 0.1 μm, aspect ratio (D/H): 150, specific surface area: 6 m²/g), KETJENBLACK EC600JD (produced by LION Corporation, primary particle size: 34 nm, specific surface area: 1270 m²/g), and PTFE (and further contains the surfactant or surface active agent and thickening agent). The contents of the flaky graphite, KETJENBLACK and PTFE were 66.5 wt %, 3.5 wt % and 30 wt %, respectively. This ink was applied on a carbon paper (produced by Mitsubishi Rayon Co., Ltd., thickness: 160 μm) which was preliminarily formed with a micro porous layer (thickness: 45 μm) and subjected to water repellent treatment with 10 wt % PTFE. After the coating operation of the ink on the carbon paper, the coated carbon paper was dried at 80° C. for 30 minutes, and baked at 330° C. for 30 minutes, and thus an anode gas diffusion layer 1 (specification type A) including a flaky graphite layer (anode micro porous layer) having a thickness of 60 μm was obtained. In this case, the relative gas diffusion coefficient of the anode micro porous layer was equal to 0.15 [-]. The tortuosity degree and effective vapor diffusion coefficient (300K) of the anode micro porous layer were 4.55 and $3.8 \times 10^{-6}$ [m²/s], respectively.

Moreover, an ink comprising acetylene black and PTFE was prepared. This ink comprises 70.0 wt % of acetylene black (produced by Denkikagaku Kogyo Kabushiki Kaisha, primary particle size: 40 nm, specific surface area: 37 m²/g), and 30.0 wt % of PTFE (and further contains the surfactant and thickening agent). This ink was applied on a carbon paper (produced by Mitsubishi Rayon Co., Ltd., thickness: 160 μm) which was preliminarily formed with a micro porous layer (thickness: 45 μm) and subjected to water repellent treatment with 10 wt % PTFE. After the coating operation of the ink on the carbon paper, the coated carbon paper was dried at 80° C. for 30 minutes, and baked at 330° C. for 30 minutes, and thus a cathode gas diffusion layer 1 (specification type B) including a cathode micro porous layer having a thickness of 60 μm was obtained. In this case, the relative gas diffusion coefficient of the cathode micro porous layer was equal to 0.40 [-]. Therefore, the difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0.25 [-]. The tortuosity degree and effective vapor diffusion coefficient (300K) of the cathode micro porous layer were 1.85 and $1.0 \times 10^{-5}$ [m²/s], respectively.

On a perfluorosulfonic acid type polymer electrolyte membrane (thickness: 15 μm), there was formed a catalyst layer including platinum-carrying carbon (carried quantity: anode 0.05 mg/cm², cathode 0.35 mg/cm²) and a perfluorosulfonic acid electrolyte solution, and thus a membrane electrode assembly was formed. This membrane electrode assembly was sandwiched between the above-mentioned anode gas diffusion layer 1 and cathode gas diffusion layer 1, and MEA 1 (combining the specification type A and the specification type B) was obtained.

Practical Example 2

A ink was prepared as follows. The ink comprises 61.3 wt % of flaky or scale-like graphite (flat diameter (D): 15 μm, thickness (H): 0.1 μm, aspect ratio (D/H): 150, specific surface area: 6 m²/g), 8.8 wt % of acetylene black (produced by Denkikagaku Kogyo Kabushiki Kaisha, primary particle size: 40 nm, specific surface area: 37 m²/g), and 30 wt % of PTFE (and further contains the surfactant and thickening agent). This ink was applied on a carbon paper (produced by Mitsubishi Rayon Co., Ltd., thickness: 160 μm) which was subjected to water repellent treatment with 10 wt % PTFE. After the coating operation of the ink on the carbon paper, the coated carbon paper was dried at 80° C. for 30 minutes, and baked at 330° C. for 30 minutes, and thus an anode gas diffusion layer 2 (specification type C) including a flaky graphite layer (anode micro porous layer) having a thickness of 60 μm. In this case, the relative gas diffusion coefficient of the anode micro porous layer was equal to 0.16 [-]. The tortuosity degree and effective vapor diffusion coefficient (300K) of the anode micro porous layer were 4.1 and 4.0×10$^{-6}$ [m$^2$/s], respectively.

Moreover, a cathode gas diffusion layer 1 (specification type B) was obtained in the same manner as in the practical example 1. The difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0.24 [−].

MEA 2 (combining the specification type C and the specification type B) was obtained by using the anode gas diffusion layer 2 and the cathode gas diffusion layer 1, in the same manner as in the practical example 1 except for the use of the anode gas diffusion layer 2 and the cathode gas diffusion layer 1.

Practical Example 3

A ink was prepared as follows. The ink comprises 40 wt % of flaky or scale-like graphite (flat diameter (D): 15 μm, thickness (H): 0.1 μm, aspect ratio (D/H): 150, specific surface area: 6 m$^2$/g), 30 wt % of KETJENBLACK EC600JD (produced by LION Corporation, primary particle size: 34 nm, specific surface area: 1270 m$^2$/g), and 30 wt % of PTFE (and further contains the surfactant and thickening agent). This ink was applied on a carbon paper (produced by Mitsubishi Rayon Co., Ltd., thickness: 160 μm) which was preliminarily formed with a micro porous layer (thickness: 45 μm) and subjected to water repellent treatment with 10 wt % PTFE. After the coating operation of the ink on the carbon paper, the coated carbon paper was dried at 80° C. for 30 minutes, and baked at 330° C. for 30 minutes, and thus an anode gas diffusion layer 3 (specification type D) including a flaky graphite layer (anode micro porous layer) having a thickness of 90 μm. In this case, the relative gas diffusion coefficient of the anode micro porous layer was equal to 0.13 [−]. The tortuosity degree and effective vapor diffusion coefficient (300K) of the anode micro porous layer were 5.20 and 3.4×10$^{-6}$ [m$^2$/s], respectively.

Moreover, a cathode gas diffusion layer 1 (specification type B) was obtained in the same manner as in the practical example 1. The difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0.27 [−].

MEA 3 (combining the specification type D and the specification type B) was obtained by using the anode gas diffusion layer 3 and the cathode gas diffusion layer 1, in the same manner as in the practical example 1 except for the use of the anode gas diffusion layer 3 and the cathode gas diffusion layer 1.

Practical Example 4

An anode gas diffusion layer 1 (specification type A) was obtained in the same manner as in the practical example 1.

Moreover, an ink comprising acetylene black and PTFE was prepared. This ink comprises 50.0 wt % of acetylene black (produced by Denkikagaku Kogyo Kabushiki Kaisha, primary particle size: 40 nm, specific surface area: 37 m$^2$/g), and 50.0 wt % of PTFE (and further contains the surfactant and thickening agent). This ink was applied on a carbon paper (produced by Mitsubishi Rayon Co., Ltd., thickness: 160 μm) which was preliminarily formed with a micro porous layer (thickness: 45 μm) and subjected to water repellent treatment with 10 wt % PTFE. After the coating operation of the ink on the carbon paper, the coated carbon paper was dried at 80° C. for 30 minutes, and baked at 330° C. for 30 minutes, and thus a cathode gas diffusion layer 2 (specification type E) including a cathode micro porous layer having a thickness of 60 μm was obtained. In this case, the relative gas diffusion coefficient of the cathode micro porous layer was equal to 0.25 [−]. Therefore, the difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0.10 [−]. The tortuosity degree and effective vapor diffusion coefficient (300K) of the cathode micro porous layer were 2.16 and 6.4×10$^{-6}$ [m$^2$/s], respectively.

MEA 4 (combining the specification type A and the specification type E) was obtained by using the anode gas diffusion layer 1 and the cathode gas diffusion layer 2, in the same manner as in the practical example 1 except for the use of the anode gas diffusion layer 1 and the cathode gas diffusion layer 2.

Comparative Example 1

MEA 5 (combining the specification type A and the specification type A) was obtained in the same manner as in the practical example 1 except for the use of the anode gas diffusion layer 1 (specification type A) in place of the cathode gas diffusion layer 1 (specification type B). The difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0 [−].

Comparative Example 2

MEA 6 (combining the specification type C and the specification type C) was obtained in the same manner as in the practical example 2 except for the use of the anode gas diffusion layer 2 (specification type C) in place of the cathode gas diffusion layer 1 (specification type B). The difference between the relative gas diffusion coefficients of the anode and cathode micro porous layers [=(the relative gas diffusion coefficient of the cathode micro porous layer)−(the relative gas diffusion coefficient of the anode micro porous layer)] was equal to 0 [−].

Comparative Example 3

MEA 7 was obtained in the same manner as in the practical example 1 except for the use of the cathode gas diffusion layer 1 (specification type B) in place of the anode gas diffusion layer 1 (specification type A), and the use of the anode gas diffusion layer 1 (specification type A) in place of the cathode gas diffusion layer 1 (specification type B). The difference between the relative gas diffusion coefficients of the anode and cathode micro porous layers [=(the relative gas diffusion coefficient of the cathode micro porous layer)−(the relative gas diffusion coefficient of the anode micro porous layer)] was equal to −0.25 [−].

(Measurement of Electrical Resistance of Gas Diffusion Layer(s) in Thickness Direction)

The electrical resistance was measured by supplying electricity in the state in which each gas diffusion layer (area: 0.95 cm$^2$) was sandwiched between sheets of gold leaf, and a load (1 MPa) was applied, thereby measuring the electric resistance and calculating the electrical resistance per 1 cm² (mΩ/1 cm²). The current value was 1 A, one cycle was set until 5 MPa, and values at 1 MPa in a second cycle were compared.

(Cell Power Generation Evaluation Result)

Figure 5:
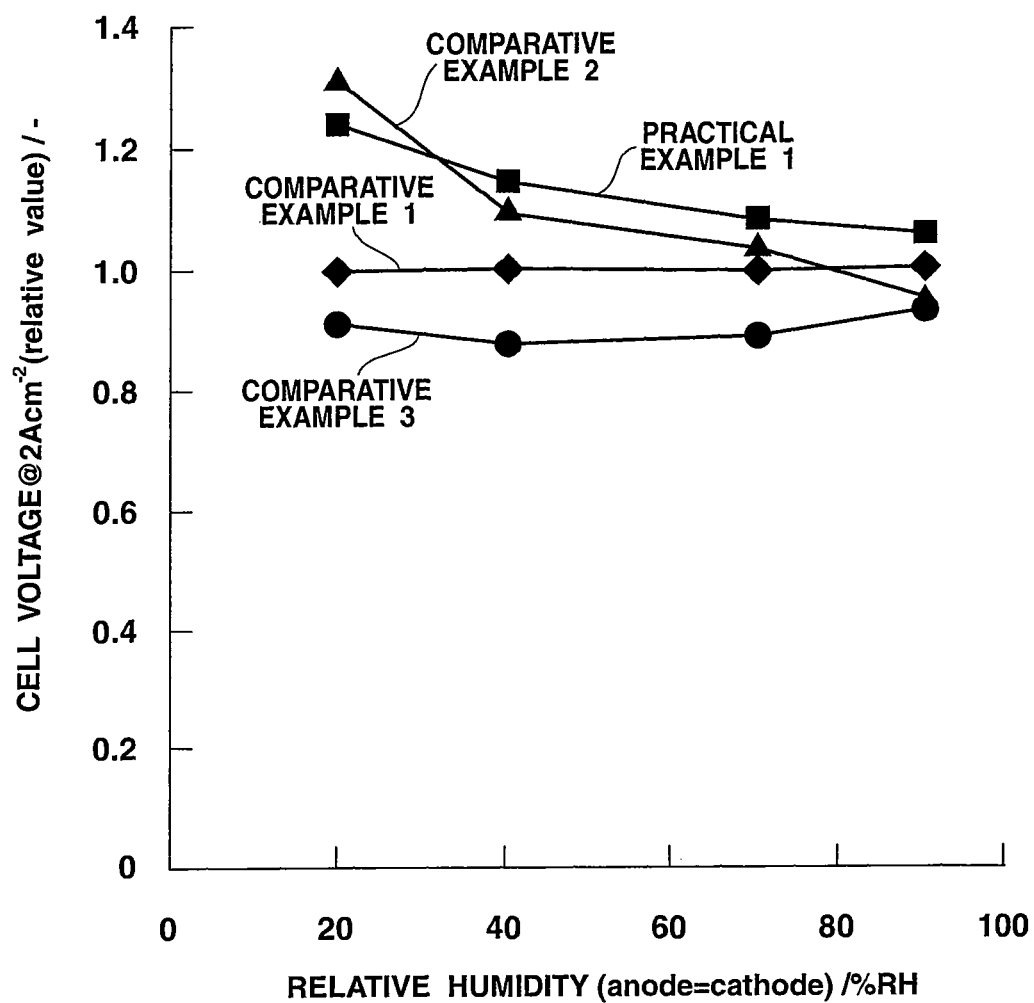
FIG. 5 is a graphic view showing power generating performance evaluation of MEAs of practical example 1 and comparative examples 1~3 at each value of a relative humidity.
Figure 6:
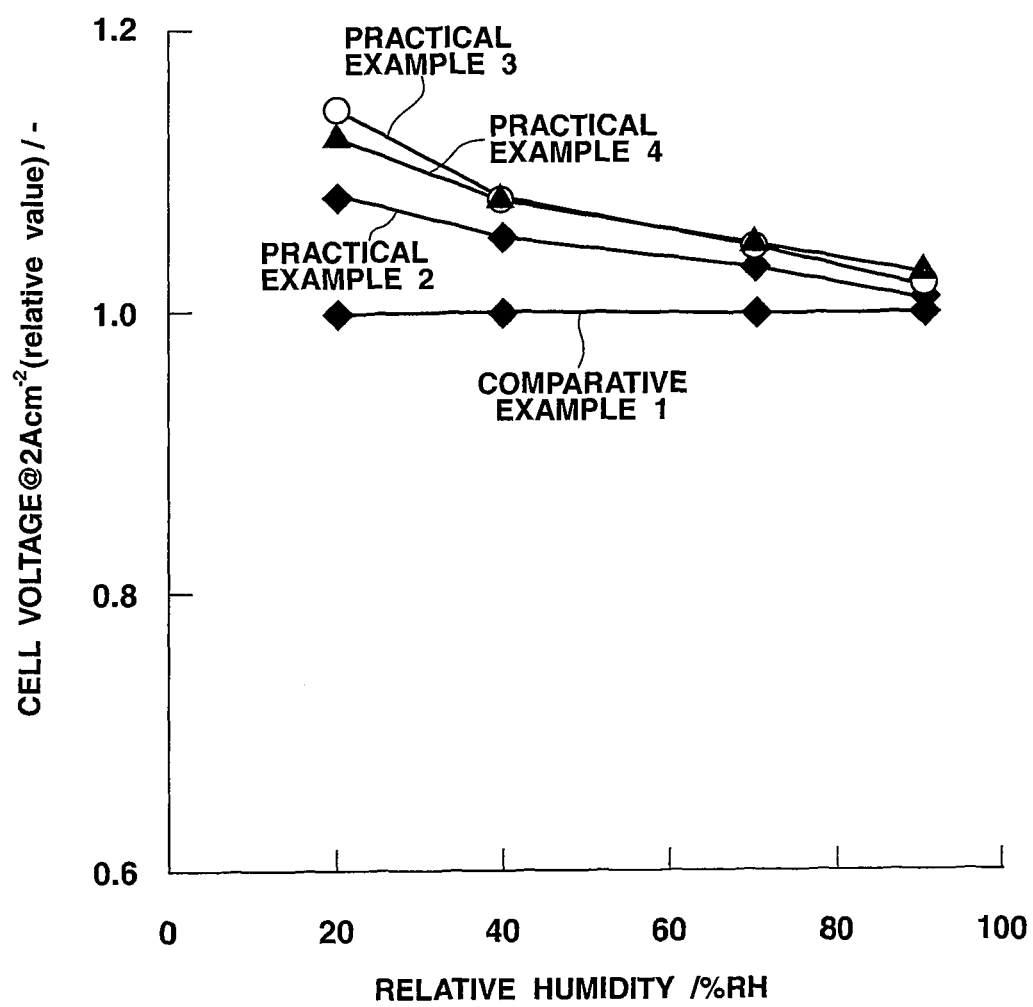
FIG. 6 is a graphic view showing power generating performance evaluation of MEAs of practical examples 2~4 and comparative example 1 at each value of the relative humidity.

A small sized unit cell for evaluation was prepared by interposing each of MEAs 1~7 of the practical examples 1~4 and the comparative examples 1~7 (the active area is 5 cm×2 cm) between gas separators formed with gas passages, and further disposing each MEA between gold-plated stainless electric collector plates. By using the thus-prepared small unit cells, power generation performance was evaluated under conditions of H2/Air, 80° C. and 200 kPa_a. Results of the power generation evaluation are shown in FIG. 5 (MEA1 of practical example 1, MEAs 5~7 of comparative examples 1~3) and FIG. 6 (MEAs 2~4 of practical examples 2~4, MEA5 of comparative example 1). In FIGS. 5 and 6, the power generation evaluation results are shown in terms of the relative values of the cell voltage (in the case in which the respective values of practical example 0.1 are set equal to one) at a current density of 2 A/cm² when the relative humidity of the anode and the relative humidity of the cathode are, respectively, equal to 20% RH and 40% RF (in the drive condition), and 70% RH and 90% RH (in the wet condition).

As shown in FIG. 5, the cell voltage representing the power generating performance, of MEA1 of the practical example 1 is high as compared to MEAs 5~7 of comparative examples 1~3, in the conditions other than 20% RH. As shown in FIG. 6, the cell voltages representing the power generating performance, of MEAs 2~4 of the practical examples 2~4 are high as compared to MEA 5 of comparative example 1 in all the conditions.

The invention claimed is:

1. An electrolyte membrane-electrode assembly comprising:
    a polymer electrolyte membrane;
    a cathode catalyst layer and a cathode gas diffusion layer including a cathode micro porous layer and a cathode gas diffusion layer substrate, arranged in order on one side of the polymer electrolyte membrane; and
    an anode catalyst layer and an anode gas diffusion layer including an anode micro porous layer and an anode gas diffusion layer substrate, arranged in order on the other side of the polymer electrolyte membrane;
    wherein a relative gas diffusion coefficient of the anode micro porous layer is smaller than a relative gas diffusion coefficient of the cathode micro porous layer by an amount equal to or greater than 0.05,
    wherein the relative gas diffusion coefficient of the anode micro porous layer is 0.05~0.2, and
    wherein the anode micro porous layer comprises a flat conductive material having a thickness of 0.05~1 µm, and an aspect ratio of 10~1000, and
    wherein the anode micro porous layer comprises the flat conductive material in the form of flaky conductive particles, and a conductive path material in the form of smaller conductive particles interposed among the flaky conductive particles to form an electrical conductive path through the flaky conductive particles, and the cathode micro porous layer comprises a granular conductive material to decrease the water vapor diffusion resistance in the cathode micro porous layer so that the water vapor diffusion resistance in the cathode micro porous layer is smaller than the water vapor diffusion resistance of the anode micro porous layer.

2. The electrolyte membrane-electrode assembly as recited in claim 1, wherein the anode micro porous layer has a tortuosity degree of 2.5~10.

3. The electrolyte membrane-electrode assembly as recited in claim 1, wherein the anode micro porous layer has an effective water vapor diffusion coefficient (300K) of $1.5\times10^{-6}$~$6.0\times10^{-6}$ m²/s.

4. The electrolyte membrane-electrode assembly as recited in claim 3, wherein the anode micro porous layer has a tortuosity degree of 2.5~10.

5. The electrolyte membrane-electrode assembly as recited in claim 1, wherein the anode micro porous layer has an effective water vapor diffusion coefficient (300K) of $1.5\times10^{-6}$~$6.0\times10^{-6}$ m²/s.

6. The electrolyte membrane-electrode assembly as recited in claim 1, wherein the anode micro porous layer has an effective water vapor diffusion coefficient (300K) of $3.0\times10^{-6}$~$5.0\times10^{-6}$ m²/s.

7. The electrolyte membrane-electrode assembly as recited in claim 1, wherein the relative gas diffusion coefficient of the anode micro porous layer is made smaller than the relative gas diffusion coefficient of the cathode micro porous layer by using the flat conductive material.

8. An electrolyte membrane-electrode assembly comprising:
    a polymer electrolyte membrane;
    a cathode catalyst layer and a cathode gas diffusion layer including a cathode micro porous layer and a cathode gas diffusion layer substrate, arranged in order on one side of the polymer electrolyte membrane; and
    an anode catalyst layer and an anode gas diffusion layer including an anode micro porous layer and an anode gas diffusion layer substrate, arranged in order on the other side of the polymer electrolyte membrane;
    wherein the anode micro porous layer comprises a flat conductive material to increase a water vapor diffusion resistance in the anode micro porous layer so that the water vapor diffusion resistance in the anode micro porous layer is greater than the water vapor diffusion resistance of the cathode micro porous layer,
    wherein the cathode micro porous layer comprises a granular conductive material to decrease the water vapor diffusion resistance in the cathode micro porous layer so that the water vapor diffusion resistance in the cathode micro porous layer is smaller than the water vapor diffusion resistance of the anode micro porous layer,
    wherein the anode micro porous layer comprises the flat conductive material in the form of flaky conductive particles, and a conductive path material in the form of smaller conductive particles interposed among the flaky conductive particles to form an electrical conductive path from one to another of the flaky conductive particles.

9. The electrolyte membrane-electrode assembly as recited in claim 8, wherein the flat conductive material has a thickness of 0.05~1 µm, and an aspect ratio of 10~1000.

10. The electrolyte membrane-electrode assembly as recited in claim 9, wherein the anode micro porous layer has a tortuosity degree of 2.5~10.

11. The electrolyte membrane-electrode assembly as recited in claim 8, wherein the anode micro porous layer has a tortuosity degree of 2.5~10.

12. The electrolyte membrane-electrode assembly as recited in claim 8, wherein the anode micro porous layer has an effective water vapor diffusion coefficient (300K) of $1.5\times10^{-6}$~$6.0\times10^{-6}$ m²/s.

13. The electrolyte membrane-electrode assembly as recited in claim 8, wherein the anode micro porous layer has an effective water vapor diffusion coefficient (300K) of $3.0 \times 10^{-6} \sim 5.0 \times 10^{-6}$ m$^2$/s.

14. The electrolyte membrane-electrode assembly as recited in claim 8, wherein a relative gas diffusion coefficient of the anode micro porous layer is smaller than a relative gas diffusion coefficient of the cathode micro porous layer by using the flat conductive material.

15. The electrolyte membrane-electrode assembly as recited in claim 14, wherein the relative gas diffusion coefficient of the anode micro porous layer is smaller than the relative gas diffusion coefficient of the cathode micro porous layer by an amount equal to or greater than 0.05.

* * * * *